United States Patent
Epshtein et al.

(10) Patent No.: US 12,539,123 B2
(45) Date of Patent: Feb. 3, 2026

(54) METHODS AND DEVICES FOR BLOOD DISPLACEMENT-BASED LOCALIZED TREATMENT

(71) Applicant: TECHNION RESEARCH & DEVELOPMENT FOUNDATION LIMITED, Haifa (IL)

(72) Inventors: Mark Epshtein, Yokneam Illit (IL); Netanel Korin, Haifa (IL)

(73) Assignee: TECHNION RESEARCH & DEVELOPMENT FOUNDATION LIMITED, Haifa (IL)

(*) Notice: Subject to any disclaimer, the term of this patent is extended or adjusted under 35 U.S.C. 154(b) by 837 days.

(21) Appl. No.: 17/262,870

(22) PCT Filed: Aug. 1, 2019

(86) PCT No.: PCT/IL2019/050874
§ 371 (c)(1),
(2) Date: Jan. 25, 2021

(87) PCT Pub. No.: WO2020/026250
PCT Pub. Date: Feb. 6, 2020

(65) Prior Publication Data
US 2021/0236140 A1    Aug. 5, 2021

Related U.S. Application Data

(60) Provisional application No. 62/713,619, filed on Aug. 2, 2018.

(51) Int. Cl.
*A61B 17/12* (2006.01)
*A61B 17/00* (2006.01)
*A61K 48/00* (2006.01)

(52) U.S. Cl.
CPC .. *A61B 17/12186* (2013.01); *A61B 17/12113* (2013.01); *A61B 17/12118* (2013.01);
(Continued)

(58) Field of Classification Search
CPC .............. A61B 17/22; A61B 17/12031; A61B 17/1204; A61B 17/12045;
(Continued)

(56) References Cited

U.S. PATENT DOCUMENTS

2002/0026210 A1    2/2002  Abdel-Gawwad
2004/0153120 A1*   8/2004  Seifert ............. A61B 17/12159
                                                        606/200
(Continued)

FOREIGN PATENT DOCUMENTS

WO    2010021779 A1    2/2010

OTHER PUBLICATIONS

Ashton et al. (Polymeric endoaortic paving: Mechanical, thermoforming, and degradation properties of polycaprolactone/ polyurethane blends for cardiovascular applications. Acta Biomaterialia, vol. 7, Issue 1, 2011, pp. 287-294. ISSN 1742-7061) (Year: 2011).*

(Continued)

*Primary Examiner* — Kevin C Sirmons
*Assistant Examiner* — William R Frehe
(74) *Attorney, Agent, or Firm* — The Roy Gross Law Firm, LLC; Roy D. Gross

(57) ABSTRACT

Disclosed herein is a method for providing localized treatment at a target site in a blood vessel of a subject. The method includes (i) delivering to a vicinity of a target site in a blood vessel a water-immiscible fluid such as to displace blood from the vicinity of the target site, and (ii) administering an active agent to the target site, wherein the water-immiscible fluid and the active agent are mutually immis- (Continued)

cible, or substantially mutually immiscible, so that the active agent is trapped by the water-immiscible fluid.

13 Claims, 17 Drawing Sheets

(52) U.S. Cl.
CPC .................. *A61B 17/12136* (2013.01); *A61B 2017/00893* (2013.01); *A61B 2017/1205* (2013.01); *A61K 48/00* (2013.01)

(58) Field of Classification Search
CPC ........ A61B 17/12109; A61B 17/12113; A61B 17/12118; A61B 17/12136; A61B 17/12186; A61B 2017/00004; A61B 2017/00876; A61B 2017/00893; A61B 2017/00938; A61B 2017/00946; A61B 2017/1205; A61B 2017/12127; A61B 2017/22051; A61B 2017/22084; A61B 2217/007; A61B 17/12181; A61M 5/1407; A61M 5/1409; A61M 2210/12
See application file for complete search history.

(56) References Cited

U.S. PATENT DOCUMENTS

| | | |
|---|---|---|
| 2005/0119682 A1 | 6/2005 | Nguyen et al. |
| 2006/0041269 A1 | 2/2006 | Horrigan |
| 2009/0299387 A1 | 12/2009 | Navia |
| 2010/0016838 A1 | 1/2010 | Butts et al. |
| 2011/0218517 A1* | 9/2011 | Ogle ...................... A61K 9/006 514/8.1 |
| 2013/0211249 A1* | 8/2013 | Barnett ................... A61L 29/18 604/82 |
| 2018/0161552 A1 | 6/2018 | Larson et al. |

OTHER PUBLICATIONS

Brisman et al (2006) Cerebral aneurysms, N. Engl. J. Med., 355: 928-939.
Sadasivan et al (2013) Physical factors effecting cerebral aneurysm pathophysiology, Ann. Biomed. Eng., 41: 1347-1365.
Health Quality Ontario, H.Q. (2006) Coil embolization for intracranial aneurysms: an evidence-based analysis, Ont Health Technol. Assess. Ser., 6:1-114.
Ahuja et al (2001) Platinum coil coatings to increase thrombogenicity: a preliminary study in rabbits, AJNR. Am. J. Neuroradiol., 14: 794-798.
Tsang et al (2015) Failure of Flow Diverter Treatment of Intracranial Aneurysms Related to the Fetal-type Posterior Communicating Artery, Neurointervention, 10: 60-66.
Cutlip et al (2001) Stent thrombosis in the modern era: a pooled analysis of multicentercoronary stant clinical trials, Circulation, 103: 1967-1971.
Suh et al (2003) Technical Feasibility of Embolizing Aneurysms with Glue (n-butyl 2-cyanoacrylate): Experimental Study in Rabbits, Am. J. Neuroradiol, 24.
Vaidya et al., An Overview of Embolic Agents. Doi: 10.1055/s-0028-1085930.
PCT Search Report for International Application No. PCT/IL2019/050874, mailed Nov. 10, 2019 , 4 pp.
PCT Written Opinion for International Application No. PCT/IL2019/050874, mailed Nov. 10, 2019 , 5 pp.
PCT Preliminary Report for International Application No. PCT/IL2019/050874, dated Feb. 2, 2021 , 6 pp.

* cited by examiner

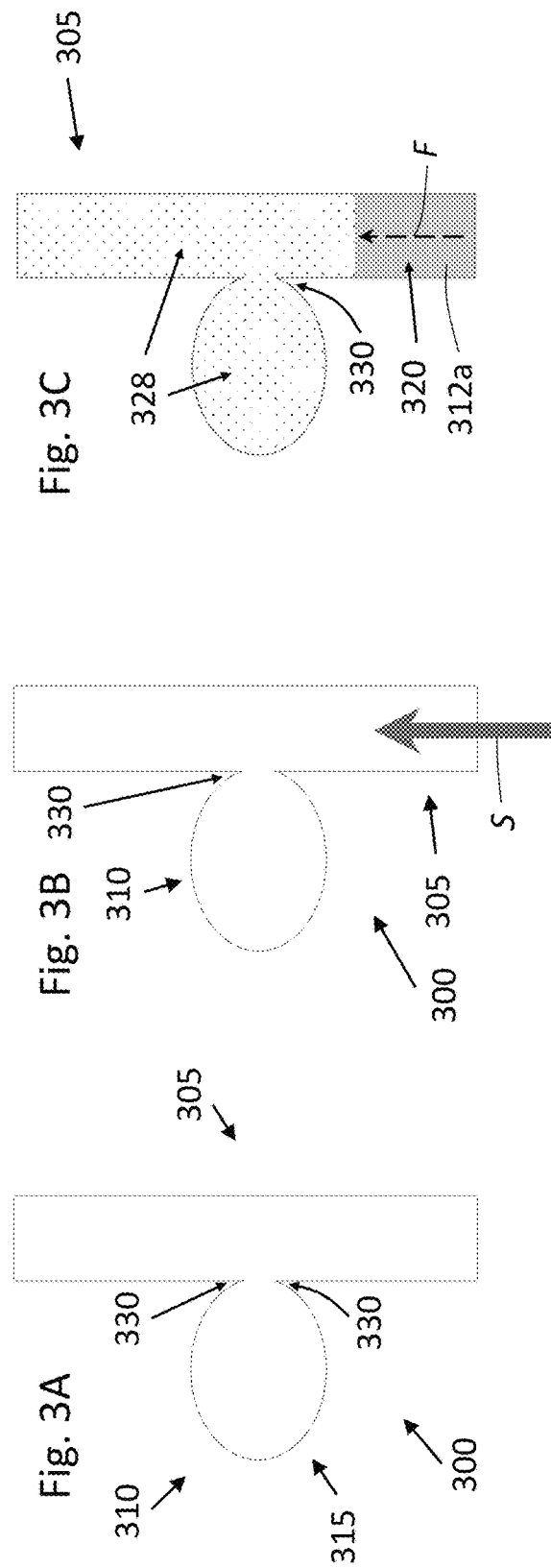
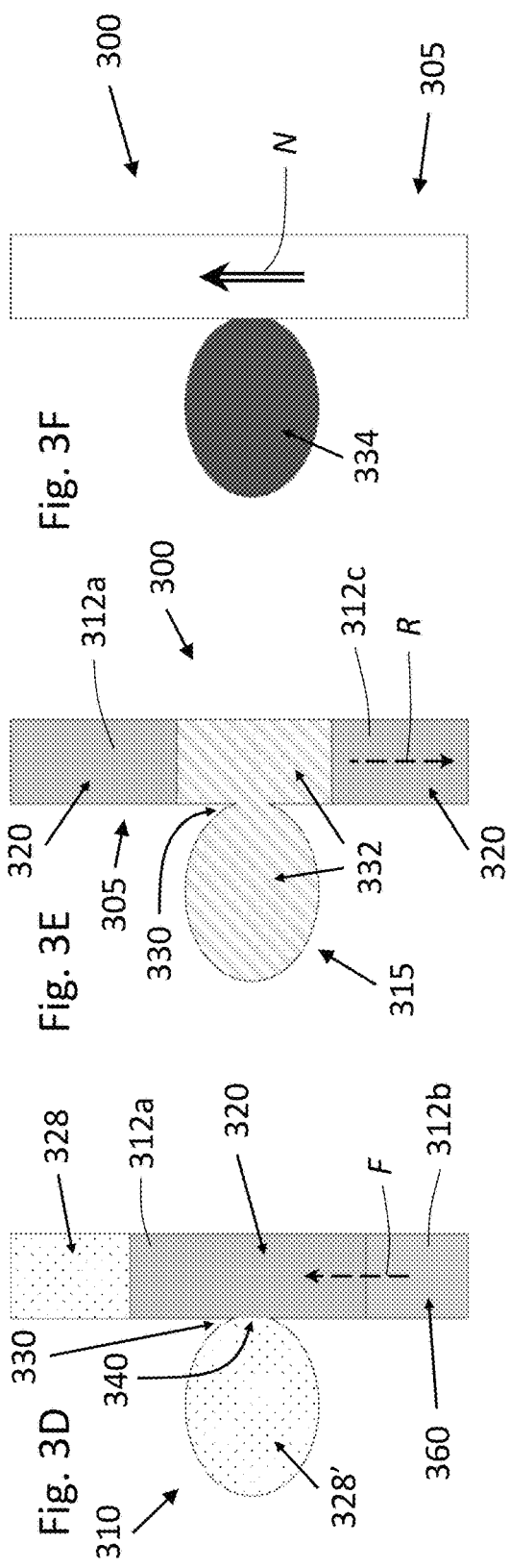

```
┌─────────────────────────────────────────────────────────────┐
│ Introducing a deployable element into a blood vessel        │
│ including a main lumen and an aneurysm. The deployable      │
│ element includes a hole on a surface thereof.               │
└─────────────────────────────────────────────────────────────┘
                              │                            └── 810
                              ▼
┌─────────────────────────────────────────────────────────────┐
│ Positioning the deployable element such that the hole is    │
│ aligned with a neck of the aneurysm and partially blocks    │
│ the neck.                                                   │
└─────────────────────────────────────────────────────────────┘
                              │                            └── 820
                              ▼
┌ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┐
  Blocking blood flow through the blood vessel.
└ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┘
                              │                            └── 825
                              ▼
┌─────────────────────────────────────────────────────────────┐
│ Delivering a WIF to the deployable element such as to form  │
│ a barrier at the hole and thereby fluidly isolate a cavity  │
│ of the aneurysm from the main lumen.                        │
└─────────────────────────────────────────────────────────────┘
                              │                            └── 830
                              ▼
┌─────────────────────────────────────────────────────────────┐
│ Administering, optionally via a catheter inserted through   │
│ the hole, an active agent into the cavity of the aneurysm   │
│ such as to occlude the aneurysm.                            │
└─────────────────────────────────────────────────────────────┘
                              │                            └── 840
                              ▼
┌ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┐
  Simultaneously with step 840, withdrawing blood from the
  aneurysm such as to maintain integrity of the barrier
  formed in step 830.
└ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┘
                              │                            └── 850
                              ▼
┌─────────────────────────────────────────────────────────────┐
│ Removing the WIF, and optionally the deployable element,    │
│ and restoring blood flow/full blood flow through the main   │
│ lumen.                                                      │
└─────────────────────────────────────────────────────────────┘
                                                           └── 860
```

Introducing a deployable element into a blood vessel including a main lumen and an aneurysm. The deployable element includes an outer tube-like member with a hole on a circumferential surface thereof, and an inner tube-like member aligned with the outer tube-like member.
— 1010

Positioning the deployable element such that the hole is aligned with a neck of the aneurysm and partially blocks the neck.
— 1020

Blocking blood flow through the blood vessel.
— 1025

Delivering a WIF into a gap between the inner tube-like member and the outer tube-like member deployable element such as to form a barrier at the hole and thereby fluidly isolate a cavity of the aneurysm from the main lumen.
— 1030

Administering, optionally via a catheter inserted through the gap and the hole, an active agent into the cavity of the aneurysm such as to occlude the aneurysm.
— 1040

Simultaneously with step 1040, withdrawing blood from the aneurysm such as to maintain integrity of the barrier formed in step 1030.
— 1050

Removing the WIF, and optionally the deployable element, and restoring blood flow/full blood flow through the main lumen.
— 1060

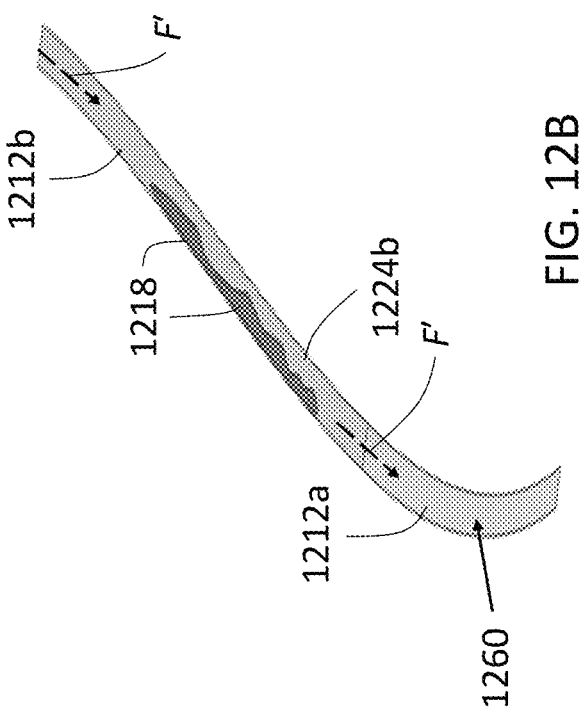
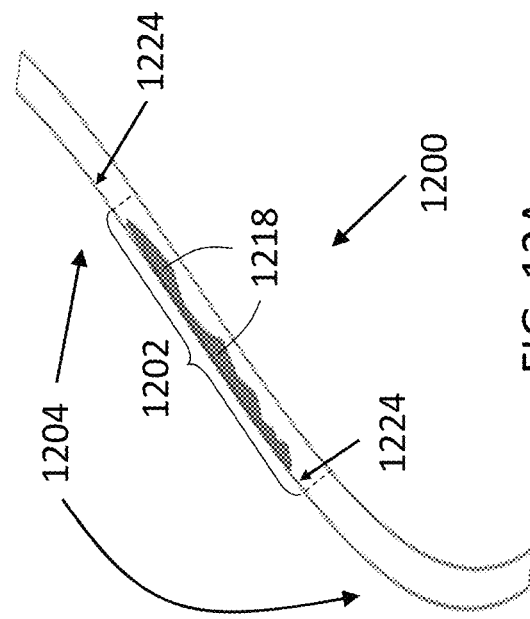
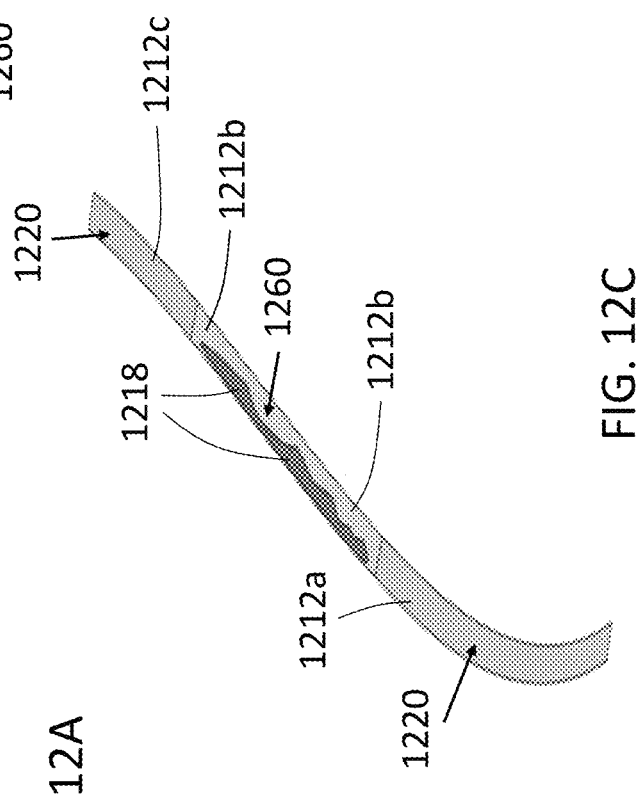
FIG. 12B
FIG. 12C
FIG. 12A

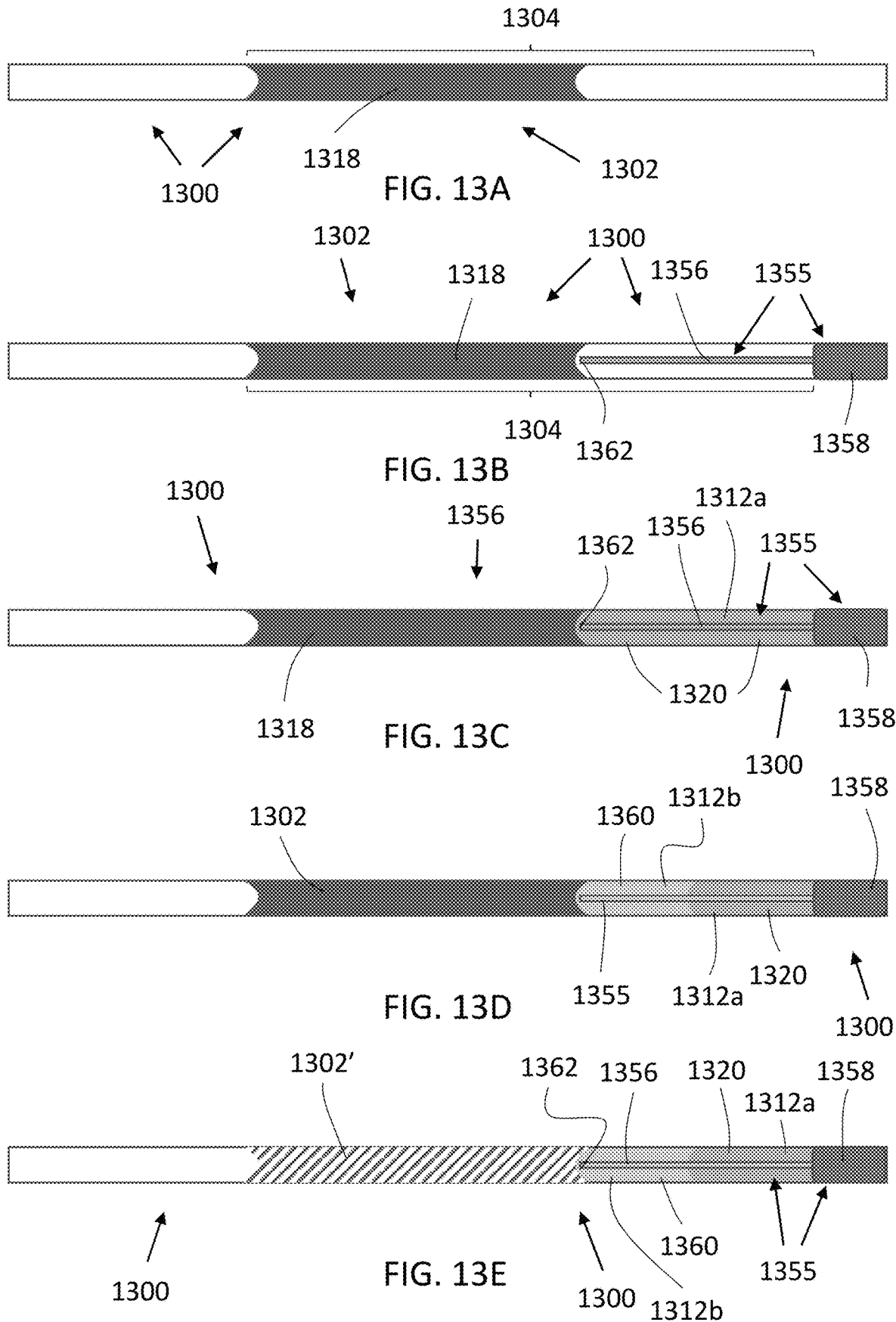

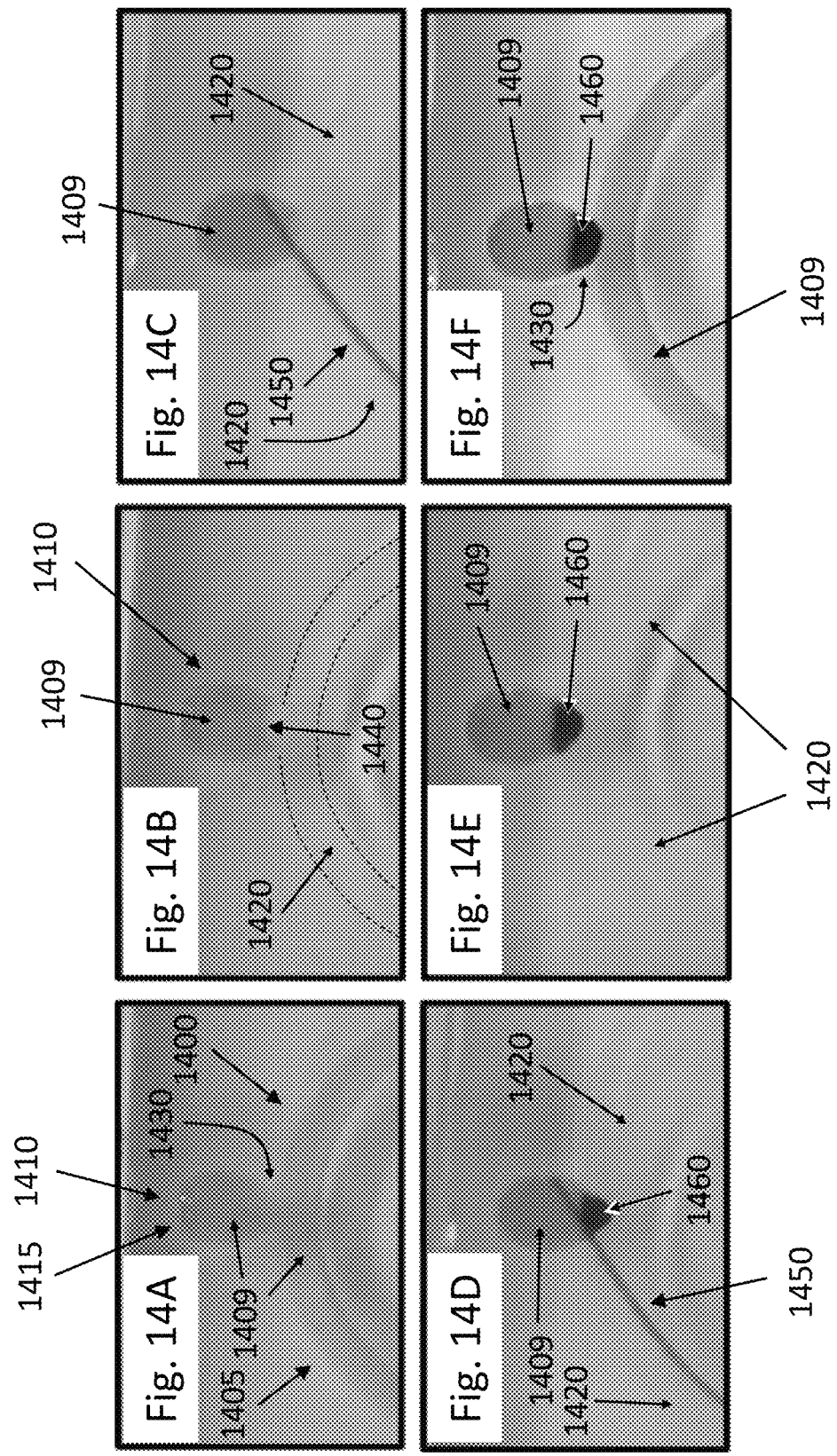

METHODS AND DEVICES FOR BLOOD DISPLACEMENT-BASED LOCALIZED TREATMENT

CROSS REFERENCE TO RELATED APPLICATIONS

This application is a National Phase of PCT Patent Application No. PCT/IL2019/050874 having International filing date of Aug. 1, 2019, which claims the benefit of priority of U.S. Provisional Patent Application No. 62/713,619, filed Aug. 2, 2018, the contents of which are all incorporated herein by reference in their entirety.

TECHNICAL FIELD

The present disclosure relates generally to methods and devices for biofluid displacement-based localized treatment in internal body passages. More specifically, but not exclusively, the present disclosure relates to methods and devices for blood displacement-based localized treatment.

BACKGROUND

Localized treatment of deformed and/or diseased target sites in a blood vessel, such as aneurysms, lesions, and other types of vascular deformations, stenosis (e.g. due to plaque or a blood clot), vascular diseases, localized cancerous growths (e.g. brain tumors), as well as genetic manipulation at a target site in a blood vessel, often present a challenge due to difficulty in isolating the target site from the blood circulation.

As an example, one of the main limitations for directly thrombosing an aneurysm cavity, or for filling the aneurysm cavity with glue, is the difficulty in isolating the aneurysm cavity, such as to allow the glue/thrombotic material to act locally at the aneurysm cavity. For this reason, direct thrombosing is rarely done.

As another example, some state-of-the-art clot-busting drugs are limited in their concentration due to severe side effects (such as tPA) or have very short activity times due to enzymes present in the blood (such as plasmins).

There thus remains a need for safe and efficient provision of localized treatment at a target site in a blood vessel.

SUMMARY

Aspects of the disclosure, according to some embodiments thereof, relate to methods and devices for providing localized treatment to a diseased site in an internal body passage. More specifically, but not exclusively, aspects of the disclosure, according to some embodiments thereof, relate to methods and devices for blood displacement-based provision of localized treatment to a diseased site in a blood vessel.

The present disclosure provides methods and devices for administering (delivering) an active agent to a target site (e.g. a diseased site) in a blood vessel (and, more generally, an internal body passage wherein biofluids may be present). According to some embodiments, the present disclosure solves the problem of systemic spreading of the active agent from the target site into the blood circulation by temporarily fluidly-isolating the vicinity of the target site from the blood circulation using a water-immiscible fluid, which is mutually immiscible both with blood and the active agent. More specifically, by proper administration thereof, due to the mutual immiscibility, the water-immiscible fluid may form a steady barrier separating the active agent from the blood circulation. Advantageously, according to some embodiments (e.g. wherein the active agent is a chemotherapeutic agent), the confinement of the active agent to the diseased site helps to prevent damage to healthy cells and tissue around the target or around the vicinity thereof, as the active agent does not, or substantially does not, come into contact therewith.

Advantageously, according to some embodiments of the disclosed methods and devices, the active agent may be isolated from the blood circulation without blocking blood flow through the blood vessel even when the normal blood flow through the blood vessel is fast.

Thus, according to an aspect of some embodiments, there is provided a method for providing localized treatment at a target site in a blood vessel of a subject. The method includes:

Delivering to a vicinity of a target site in a blood vessel a water-immiscible fluid such as to displace blood from the vicinity of the target site.

Administering an active agent to the target site, wherein the water-immiscible fluid and the active agent are mutually immiscible, or substantially mutually immiscible, so that the active agent is trapped by the water-immiscible fluid.

According to some embodiments, the method further includes, prior to delivering the water-immiscible fluid, blocking blood flow to the vessel.

According to some embodiments, the blocking of the blood flow to the vessel is effected using a balloon catheter.

According to some embodiments, the method further includes, prior to delivering the water-immiscible fluid, diluting blood in the vicinity of the target site by a saline infusion and/or a viscoelastic fluid further configured to locally increase viscosity of the blood and dampen blood vortices.

According to some embodiments, the method further includes, subsequent to the administering of the active agent, removing from the blood vessel the water-immiscible fluid, and, optionally, the active agent.

According to some embodiments, the active agent includes a drug.

According to some embodiments, the active agent includes a nucleic acid. The method is thereby configured for providing gene therapy at the target site.

According to some embodiments, the active agent includes an anticancer drug targeting a cancerous cell growth at the target site. The method is thereby configured to treat the cancerous cell growth.

According to some embodiments, the active agent includes one or more substances configured to dissolve a deposit or a lesion at the target site. The method is thereby configured for treating blockages in a blood vessel.

According to some embodiments, the water-immiscible fluid and the active agent are delivered in a three-layered injection: A first layer (which is injected first) includes a first portion of the water-immiscible fluid, a second layer (which is injected second) includes the active agent, and a third layer (which is injected last) includes a second portion of the water-immiscible fluid. The three layers are injected continuously one after the other such that the second layer, which is positioned between the first layer and the third layer, is maneuvered, at least in part, thereby (i.e. by the first layer and the third layer) to the target site.

According to some embodiments, the target site forms a full blockage of the blood vessel. The delivery of the water-immiscible fluid and the administration of the active agent are effected by a two-layered injection: A first layer includes the water-immiscible fluid, and a second layer includes the active agent. The two layers are injected continuously one after the other (the first layer is injected first) such as to fluidly-isolate the second layer between the blockage and the first layer.

According to some embodiments, the blood vessel includes a main lumen and an aneurysm including an aneurysm cavity and an aneurysm neck positioned between the main lumen and the aneurysm cavity. The target site includes the aneurysm cavity, and the vicinity of the target site includes the aneurysm neck. In the step of delivering the water-immiscible fluid, the water-immiscible fluid is delivered such as to form a barrier to blood flow at the aneurysm neck, thereby fluidly-isolating the aneurysm cavity from the main lumen. In the step of administering an active agent, the active agent, or at least a portion thereof, is delivered into the aneurysm. The active agent is configured to form or to induce a formation of a blood clot in the aneurysm cavity.

According to some embodiments, the active agent is directly administered into the aneurysm cavity.

According to some embodiments, the water-immiscible fluid and the active agent are delivered in a three-layered injection: A first layer (which is injected first) includes a first portion of the water-immiscible fluid, a second layer (which is injected second) includes the active agent, and a third layer (which is injected last) includes a second portion of the water-immiscible fluid. The three layers are injected continuously one after the other such that the second layer, which is positioned between the first layer and the third layer, is maneuvered, at least in part, thereby into the aneurysm cavity.

According to some embodiments, a surface tension of the water-immiscible fluid is such as to prevent the water-immiscible fluid from penetrating into the aneurysm cavity through the aneurysm neck.

According to some embodiments, the water-immiscible fluid is configured to form a meniscus at the aneurysm neck. The meniscus constitutes the barrier.

According to some embodiments, the method further includes, simultaneously, or substantially simultaneously, to the administering of the active agent, withdrawing blood from the aneurysm, such as to maintain an integrity or positioning of the barrier.

According to some embodiments, in the step of administering the active agent, the active agent is administered using a catheter, which extends into the aneurysm cavity through the barrier formed by the water-immiscible fluid.

According to some embodiments, the method further includes inserting into the blood vessel a deployable element and mounting of the deployable thereat. The deployable element is hollow and includes a hole on a surface thereof. The hole has a smaller diameter than a diameter of the aneurysm neck. The deployable element is mounted in the blood vessel such that the surface of the deployable element is adjacent to the aneurysm neck and the hole is aligned with the aneurysm neck, thereby facilitating the formation by the water-immiscible fluid of the barrier at the hole when the water-immiscible fluid is delivered thereto.

According to some embodiments, the deployable element includes an (outer) tube-like member. The tube-like member is configured to receive thereinto the water-immiscible fluid. The hole is located on a shell of the tube-like member. The shell defines the surface.

According to some embodiments, the hole is configured to allow insertion therethrough of a catheter configured to administer the active agent.

According to some embodiments, the deployable element further includes an inner tube-like member extending inside and along the outer tube-like member. The tube-like members are configured to receive into a gap there between the water-immiscible fluid. The inner tube-like member is configured to facilitate blood flow therethrough.

According to some embodiments, the gap is configured to allow insertion therethrough of a catheter configured to administer the active agent.

According to some embodiments, the outer tube-like member includes a stent.

According to some embodiments, the deployable element includes an inflatable balloon.

According to some embodiments, the active agent includes one or more of a thrombotic agent, glue agent, gelling agent, crosslinker, plasticizer, binder, and/or any combination thereof.

According to some embodiments, the method further includes:
  Prior to the delivering of the water-immiscible fluid, inserting into the blood vessel a deployable element including a hollow body such as to allow flow of blood therethrough.
  Shifting the deployable element along the blood vessel to a position wherein the deployable element is adjacent to the target site.

The hollow body is shaped such that, when the deployable element is properly installed within the blood vessel, a surface of the hollow body and a wall of the blood vessel define a pocket configured to allow trapping of water-immiscible fluid therein. In the step of delivering the water-immiscible fluid, the water-immiscible fluid is delivered into the pocket between the surface of the hollow body and the wall of the blood vessel.

According to some embodiments, the hollow body extends from a round, or substantially round, first edge to a round, or substantially round, second edge. Each of the first edge and second edge may have a diameter substantially equal to a diameter of the blood vessel. An intermediate section of the hollow body has a diameter which is smaller than the diameter of the first edge and the diameter of the second edge.

According to some embodiments, the hollow body is hourglass-shaped, or substantially hourglass-shaped.

According to some embodiments, the deployable element further includes a catheter tube. An end portion of the catheter tube is attached to one of the edges of the hollow body, such as to allow delivering water-immiscible fluid into the pocket formed between the surface of the hollow body and the wall of the blood vessel when the deployable element is properly installed within the blood vessel.

According to some embodiments, the catheter tube is further configured for delivering therethrough the active agent.

According to some embodiments, the surface of the hollow body includes a catheter insertion port dimensioned such as to prevent escape therethrough of the water-immiscible fluid when the deployable element is properly installed within the blood vessel and the pocket between the surface of the hollow body and the wall of the blood vessel is filled with water-immiscible fluid. In the step of administering the active agent, the active agent is administered using a catheter inserted via the catheter insertion port into the pocket between the surface of the hollow body and the wall of the blood vessel.

According to some embodiments, the surface tension of the water-immiscible fluid compared to water is in the range of from about 40 mN/m to about 70 mN/m at a temperature of 20° C.

According to some embodiments, the water-immiscible fluid is hydrophobic.

According to some embodiments, the water-immiscible fluid is selected from the group consisting of oil, dimethyl sulfoxide, ethylene glycol, propylene carbonate, toluene, fluorocarbon, mercury, gallium, and any derivative or combination thereof.

According to some embodiments, the water-immiscible fluid is a gas.

According to some embodiments, the method further includes an initial step of imaging the vicinity of the target site. According to some embodiments, the selection of the water-immiscible fluid and/or the deployable element (in embodiments wherein a deployable element is used) may be based on the geometry of the vicinity of the target site, and, in particular, the target site (e.g. the area of the aneurysm neck when the target site includes an aneurysm).

According to an aspect of some embodiments, there is provided a deployable element (member) for localized treatment at a target site in a blood vessel of a subject. The deployable element includes a hollow body configured to allow flow of blood therethrough, and a catheter tube. The hollow body extends from a round, or substantially round, first edge to a round, or substantially round, second edge. Each of the first edge and the second edge has a diameter substantially equal to a diameter of a blood vessel within which the deployable element is intended to be mounted. An intermediate section of the hollow body has a diameter smaller than the diameters of the first edge and the second edge. The deployable element is thereby configured such that when properly mounted within the blood vessel, the hollow body and walls of the blood vessel define there between a pocket configured to allow trapping of a water-immiscible fluid therein. An end portion of the catheter tube is attached to one of the edges of the hollow body, such as to allow delivering water-immiscible fluid into the pocket.

According to an aspect of some embodiments, there is provided a kit for treating a wide neck and/or fusiform aneurysm in a blood vessel. The kit includes:
- A deployable element including a hole on a surface thereof. The hole has a smaller diameter than a diameter of a neck of the aneurysm.
- A water-immiscible fluid configured to be administered into the blood vessel and to isolate the aneurysm from the blood flow in the blood vessel.
- A catheter configured to administer an active agent into the aneurysm. The catheter is insertable into the aneurysm via the hole in the deployable element.
- An active agent for treating the aneurysm by exertion of an effect on the content of the aneurysm or by accumulation in the aneurysm.

According to an aspect of some embodiments, there is provided a method for treating an aneurysm in a blood vessel of a subject. The aneurysm includes an aneurysm cavity and an aneurysm neck between a main lumen of the blood vessel and the aneurysm cavity. The method includes:
- Restricting blood flow between the main lumen and the aneurysm cavity by delivering a water-immiscible material (water-immiscible fluid) into the blood vessel, such as to form a barrier to blood flow at the aneurysm neck.
- Administering an active agent into the aneurysm cavity, wherein the active agent is configured to form or to induce a formation of a blockage between the main lumen and the aneurysm cavity.
- Removing the water-immiscible material from the blood vessel.

Certain embodiments of the present disclosure may include some, all, or none of the above advantages. One or more other technical advantages may be readily apparent to those skilled in the art from the figures, descriptions, and claims included herein. Moreover, while specific advantages have been enumerated above, various embodiments may include all, some, or none of the enumerated advantages.

Unless otherwise defined, all technical and scientific terms used herein have the same meaning as commonly understood by one of ordinary skill in the art to which this disclosure pertains. In case of conflict, the patent specification, including definitions, governs. As used herein, the indefinite articles "a" and "an" mean "at least one" or "one or more" unless the context clearly dictates otherwise.

BRIEF DESCRIPTION OF THE FIGURES

Some embodiments of the disclosure are described herein with reference to the accompanying figures. The description, together with the figures, makes apparent to a person having ordinary skill in the art how some embodiments may be practiced. The figures are for the purpose of illustrative description and no attempt is made to show structural details of an embodiment in more detail than is necessary for a fundamental understanding of the disclosure. For the sake of clarity, some objects depicted in the figures are not to scale.

In the Figures:

FIGS. 3A-3F schematically depict successive stages in an implementation of an embodiment of the method of FIG. 1, wherein a water-immiscible fluid and an active agent are delivered into a blood vessel, which includes an aneurysm, in a three-layered injection;

FIG. 8 presents a flowchart of a blood displacement-based method for occluding a wide-neck/fusiform aneurysm, according to some embodiments;

FIG. 10 presents a flowchart of a blood displacement-based method for occluding a wide-neck/fusiform aneurysm, according to some embodiments;

FIGS. 12A-12C schematically depict use of an embodiment of the method of FIG. 11 for treatment of partial blockage within a blood vessel;

FIGS. 13A-13E schematically depict use of an embodiment of the method of FIG. 11 for treatment of full blockage within a blood vessel;

FIGS. 14A-14F present successively taken photos of an experimental set up simulating treatment of an occlusion of an aneurysm in a blood vessel using direct injection of an active agent into the aneurysm, according to an embodiment of the method of FIG. 1;

DETAILED DESCRIPTION

Figure 1:
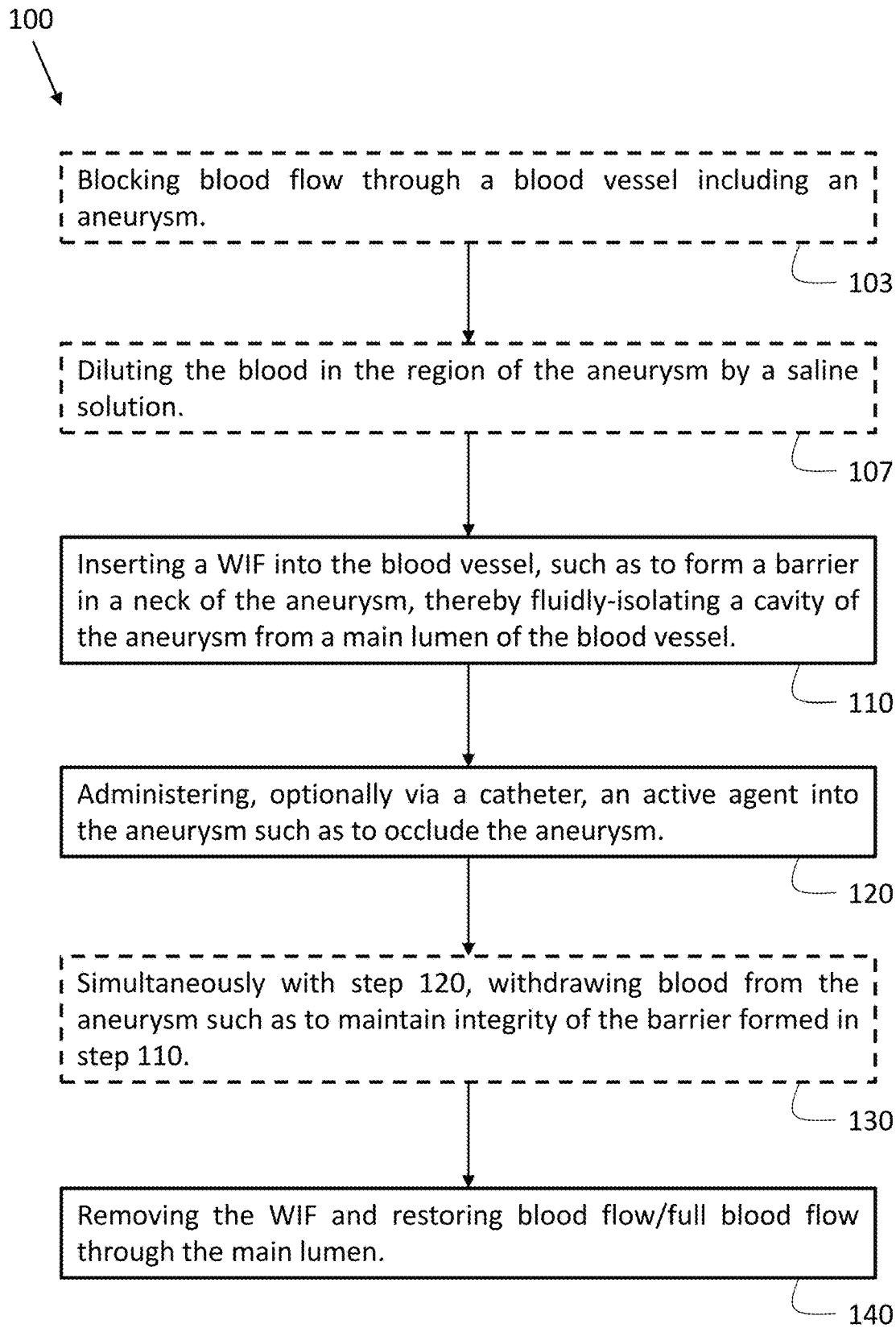
FIG. 1 presents a flowchart of a blood displacement-based method for occluding an aneurysm, according to some embodiments.

The principles, uses, and implementations of the teachings herein may be better understood with reference to the accompanying description and figures. Upon perusal of the description and figures present herein, one skilled in the art will be able to implement the teachings herein without undue effort or experimentation. In the figures, same reference numerals refer to same parts throughout.

In figures representing methods, optional steps are described within dash-lined boxes.

In the description and claims of the application, the words "include" and "have", and forms thereof, are not limited to members in a list with which the words may be associated.

As used herein, the term "about" may be used to specify a value of a quantity or parameter (e.g. the length of an element) to within a continuous range of values in the neighborhood of (and including) a given (stated) value. According to some embodiments, "about" may specify the value of a parameter to be between 80% and 120% of the given value. For example, the statement "the length of the element is equal to about 1 m" is equivalent to the statement "the length of the element is between 0.8 m and 1.2 m". According to some embodiments, "about" may specify the value of a parameter to be between 90% and 110% of the given value. According to some embodiments, "about" may specify the value of a parameter to be between 95% and 105% of the given value.

As used herein, according to some embodiments, the terms "substantially" and "about" may be interchangeable.

As used herein, according to some embodiments, the term "water-immiscible fluid" refers to a fluid which is not only immiscible, or substantially immiscible, in water, but also immiscible, or substantially immiscible, in blood.

As used herein, according to some embodiments, the term "immiscible" with reference to two fluids, refers to two fluids which do not, or substantially do not, spontaneously mix, over a time interval defined by a medical treatment/procedure during which the fluids are in contact. Thus, a "water-immiscible fluid" injected into a blood vessel as part of a medical treatment/procedure, may remain substantially unmixed with blood/undissolved within the blood for the duration of the treatment/procedure. As used herein, according to some embodiments, the term "substantially unmixed", with reference to two immiscible, or substantially immiscible, fluids, is taken to mean that a first of the two fluids forms a first body of fluid within the second fluid or between two bodies of the second fluid, such that the first body of fluid is at least 75% pure (e.g. 75% of the first body of fluid is composed of the first fluid), at least 80%, at least 85% pure, at least 90%, or even at least 95% pure.

Systems and Methods for Occluding Aneurysms

Reference is now made to FIG. 1, which presents a flowchart of a method 100 for treating an aneurysm in a blood vessel. (Optional steps are described within dash-lined boxes.) According to some embodiments, method 100 includes:

A step 110 of delivering to a vicinity of an aneurysm in a blood vessel a water-immiscible fluid (WIF): The water-immiscible is inserted into a blood vessel including an aneurysm. The water-immiscible fluid is inserted such that (e.g. maneuvered to a position wherein) the water-immiscible fluid restricts/prevents blood flow between a main lumen of the blood vessel and an aneurysm cavity (e.g. the water-immiscible fluids forms a barrier to blood flow at the aneurysm neck).

A step 120 of administering (delivering) an active agent to the aneurysm: The active agent is administered into the aneurysm cavity (while the aneurysm is fluidly-isolated by the water-immiscible fluid). The active agent may be configured to provide (long-term) occlusion of the aneurysm (thus allowing the aneurysm to shrink/stabilize or at least reduce the chance of bleeding).

An optional step 130, performed simultaneously, or substantially simultaneously, to step 120, wherein blood is withdrawn from the aneurysm such as to maintain the integrity of the barrier formed by the water-immiscible fluid.

A step 140 wherein the water-immiscible fluid is removed from the blood vessel, and blood flow/full blood flow through the main lumen is restored.

According to some embodiments, in step 110 the water-immiscible fluid may be inserted into the blood vessel by injection at a site in the blood vessel located near the aneurysm. For example, according to some embodiments, the water-immiscible fluid may be injected upstream of the aneurysm and may continue to be injected until some of the water-immiscible fluid reaches the aneurysm (that is, as more of the water-immiscible fluid is injected, pressure builds up driving the front of the water-immiscible fluid towards the aneurysm). The surface tension and viscosity of the water-immiscible fluid may be such as to ensure that blood pulsations do not cause the water-immiscible fluid to be driven downstream (that is, the water-immiscible fluid remains localized at the site of the aneurysm). According to some embodiments, magnetic forces or ultrasonic waves may be used to guide the water-immiscible fluid from the injection site to the aneurysm.

According to some embodiments, step 110 is preceded by a step 103, wherein blood flow through the blood vessel, at least along a segment thereof that includes the aneurysm, is temporarily blocked. Step 103 may be effected, for example, by inserting a balloon catheter into the blood vessel upstream of the aneurysm and inflating the balloon. (The balloon may also be positioned downstream to the aneurysm as long as there are not any bi-furcating branches between the balloon and the aneurysm.) The blocking of the blood flow through the blood vessel allows using a water-immiscible fluid, such as gas, which does not adhere to the walls of the blood vessel, and which would otherwise be easily carried away downstream by the blood flow. It is noted that in embodiments, including step 103, step 140 may further include removing the blocking of the blood flow through the blood vessel (e.g. by deflating of the balloon catheter which may then be pulled out).

According to some embodiments, step 110 is preceded by a step 107, wherein a saline solution (saline infusion) is infused into the blood vessel to dilute the blood in the region of the aneurysm and thereby increase the surface tension of the water-immiscible fluid once injected in step 110. (The dilution of the blood acts to increase the surface energy of the water-immiscible fluid-blood interface.) More generally, a viscoelastic fluid may be infused into the blood vessel, the viscoelastic fluid being configured not only to increase the surface tension of the water-immiscible fluid (once injected) but also to locally increase viscosity of the blood and dampen blood vortices. It will be understood that step 107 is optional and, depending on the water-immiscible fluid (i.e. on the surface tension thereof as compared to (undiluted) blood), may be unnecessary. In embodiments including step 103, step 107 may follow step 103.

The water-immiscible fluid is characterized by a surface tension such as to prevent the water-immiscible fluid from entering/penetrating into the aneurysm cavity. More specifically, the dimensions of the aneurysm neck and the surface tension of the water-immiscible fluid are such as to preclude entry of the water-immiscible fluid into the aneurysm cavity, with the water-immiscible fluid forming a barrier (e.g. a meniscus) to blood flow (between the aneurysm cavity and the main lumen) in the aneurysm neck. Further, it will be understood that the water-immiscible fluid is intended to provide temporary blockage of the aneurysm (the water-immiscible fluid may be taken out at the end of the occlusion procedure, thereby restoring full, or substantially full, blood flow through the blood vessel), as opposed to the active agent which is intended to provide long-term occlusion of the aneurysm.

According to some embodiments of step 120, a catheter may be used to administer the active agent. The catheter may be inserted into the aneurysm cavity via the barrier formed by the water-immiscible fluid at or about the aneurysm neck, as depicted, for example, in FIGS. 2A-2C and in FIG. 4. Following the delivery of the active agent, the catheter may be removed.

Figure 4:
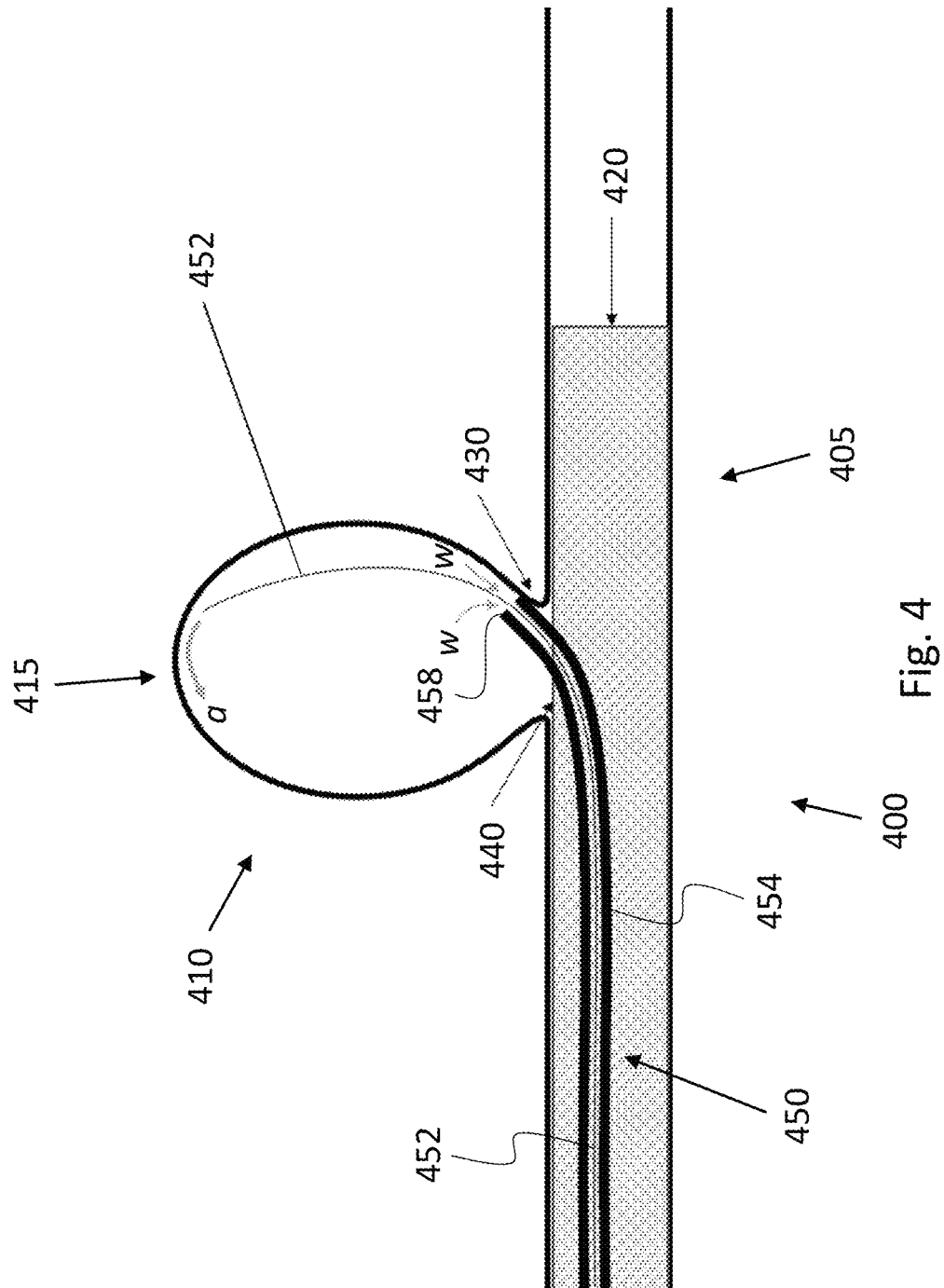
FIG. 4 schematically depicts a multi-lumen catheter inserted into an aneurysm, the multi-lumen catheter being configured for simultaneous administering of an active agent into the aneurysm and withdrawal of blood therefrom, according to some embodiments.

According to some embodiments of method 100, wherein method 100 includes step 130, a multi-lumen catheter, such as the catheter depicted in FIG. 4, may be used to perform steps 120 and 130. According to some embodiments, a rate of the blood withdrawal in step 130 is equal, or about equal, to a rate of the active agent administration in step 120. The simultaneous withdrawal of blood prevents build-up of excess pressure in the aneurysm, thereby helping to maintain the integrity of the barrier and preventing rupture of the aneurysm, as mentioned above. Further, the simultaneous withdrawal of blood may help mix the active agent, leading to the formation of a large blood clot(s), as opposed to small, ineffective blood clots.

Figures 2A, 2B, 2C:
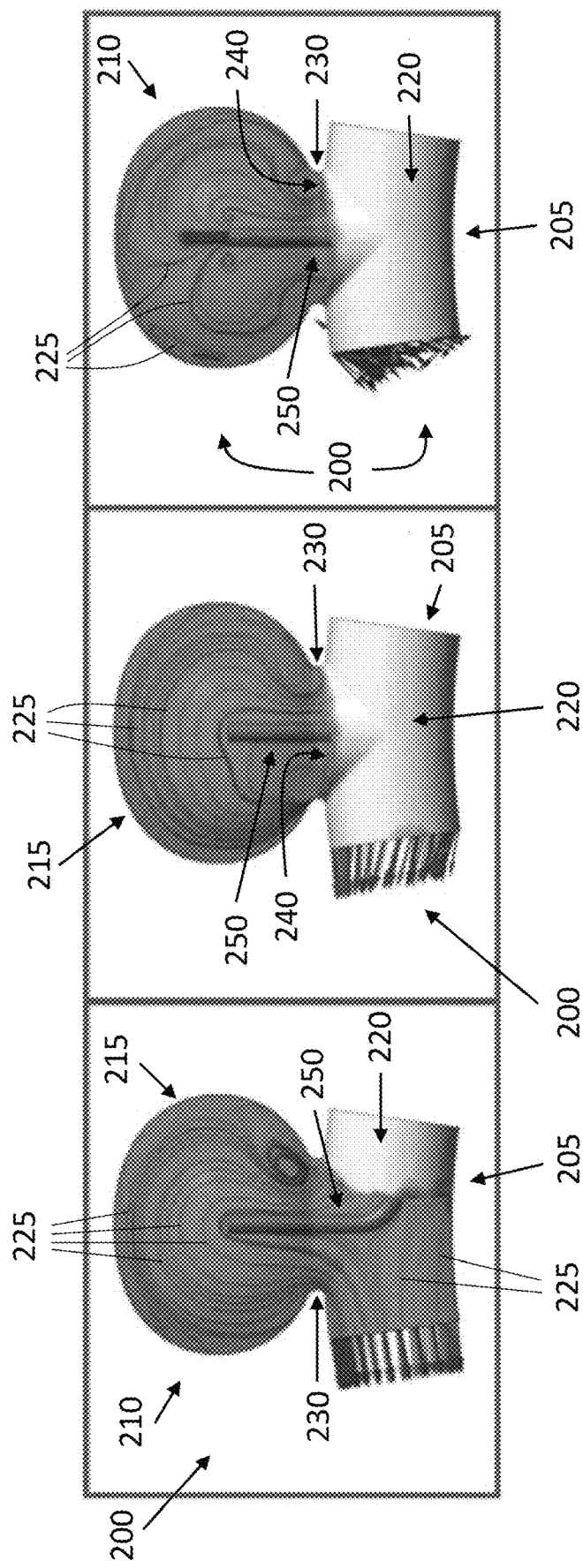
FIG. 2A schematically depicts a stage in an implementation of an embodiment of the method of FIG. 1, wherein a catheter has been inserted into an aneurysm and a water-immiscible fluid is advancing in the blood vessel towards the aneurysm.
FIG. 2B schematically depicts a stage in the implementation of the embodiment of the method of FIG. 1, following the stage depicted in FIG. 2A, wherein the water-immiscible fluid has reached the aneurysm and forms a barrier at a neck of the aneurysm.
FIG. 2C schematically depicts a stage in the implementation of the embodiment of the method of FIG. 1, following the stage depicted in FIG. 2B, wherein an active agent is administered into the aneurysm via the catheter.

According to some embodiments, in step 140 the water-immiscible fluid may be removed using a catheter, i.e. the water-immiscible fluid may be withdrawn into the catheter. Reference is now made to FIGS. 2A-2C, which schematically depict stages in an implementation of method 100, according to some embodiments thereof. More specifically, FIGS. 2A-2C depict successive stages in the (fluid) isolation of an aneurysm from a main lumen of a blood vessel. Depicted is a blood vessel 200 including a main lumen 205 (i.e. a main blood lumen) and an aneurysm 210. Aneurysm 210 includes an aneurysm cavity 215 and an aneurysm neck 230 (in this case a narrow neck), which connects aneurysm cavity 215 to main lumen 205. A water-immiscible fluid 220 is shown advancing (e.g. downstream) in main lumen 205. According to some embodiments, water-immiscible fluid 220 may be delivered into blood vessel 200 by injection at a location along main lumen 205 near aneurysm 210. Blood flow lines 225 (not all of which are numbered) indicate the direction and density of the blood flow within main lumen 205 and aneurysm 210.

FIG. 2A depicts a stage in an embodiment of method 100 prior to the formation of the barrier at the aneurysm neck in step 110. FIG. 2B depicts a stage in the embodiment of method 100 after the formation of the barrier at the aneurysm neck in step 110, but prior to the administering of the active agent into the aneurysm cavity in step 120. FIG. 2C depicts a stage in the embodiment of method 100 during the administering of the active agent into the aneurysm cavity in step 120.

In FIG. 2A water-immiscible fluid 220 is yet to reach aneurysm 210, and aneurysm neck 230 fluidly couples aneurysm cavity 215 to main lumen 205 (so that blood is free to flow from main lumen 205 into aneurysm cavity 215 and vice-versa). In FIGS. 2B and 2C water-immiscible fluid 220 has reached aneurysm 210 so that aneurysm cavity 215 may be fluidly decoupled from main lumen 205. More specifically, in FIGS. 2B and 2C water-immiscible fluid 220 partially/fully blocks aneurysm neck 230, thereby restricting/fully blocking blood flow between aneurysm cavity 215 and main lumen 205. In FIG. 2C an active agent is administered via a catheter 250 into aneurysm cavity 215, as indicated by the change in the direction and density of blood flow lines 225 from FIG. 2B to FIG. 2C.

According to some embodiments, the surface tension of water-immiscible fluid 220 prevents the penetration (entry) thereof into aneurysm cavity 215. According to some embodiments, and as depicted in FIGS. 2B and 2C, water-immiscible fluid 220 forms a barrier 240 (e.g. in the form of a meniscus) at aneurysm neck 230. According to some embodiments, barrier 240 (e.g. the meniscus) is concave.

According to some embodiments, the water-immiscible fluid (such as, but not limited to, water-immiscible fluid 220) is selected based on the dimensions (e.g. diameter) of the aneurysm which is to be occluded. That is, the water-immiscible fluid is selected such that the surface tension thereof complies with the dimensions of aneurysm neck 230 in the sense of forming a stable barrier at aneurysm neck 230 (and not penetrating into aneurysm cavity 215). As used herein, according to some embodiments, the term "stable barrier", with reference to a barrier formed by a water-immiscible fluid in a neck of an aneurysm, refers to a barrier which remains intact (at least for the duration of the occlusion procedure).

According to some embodiments, without being bound to any scientific theory, the water-immiscible fluid at, or in vicinity of, aneurysm neck 230 is characterized by a Weber number We smaller than 1, wherein We=$\rho v^2 l/\sigma$ with $\rho$ being the density of water-immiscible fluid 220, $v$ being the injection velocity (e.g. into main lumen 205) of water-immiscible fluid 220, $l$ being a (largest) characteristic length of aneurysm neck 230 (e.g. a diameter thereof when (a cross-section of) aneurysm neck 230 is circular, or a length of the major axis thereof when (a cross-section of) aneurysm neck 230 is elliptical), and $\sigma$ being the surface tension between water-immiscible fluid 220 and the blood.

Catheter 250 may be inserted prior to the delivery of water-immiscible fluid 220 to aneurysm 210 (as shown in FIGS. 2A-2C), simultaneously to the delivery of water-immiscible fluid 220 to aneurysm 210, or after at least part of water-immiscible fluid 220 has reached the vicinity of aneurysm 210 (e.g. after barrier 240 is formed).

Reference is now made to FIGS. 3A-3F, which schematically depict stages in an implementation of method 100, according to some embodiments thereof. It is noted that the depicted implementation does not include (optional) step 130.

In FIGS. 3A-3F, a water-immiscible fluid 320 and an active agent 360 are introduced into a blood vessel 300 in a three-layered-injection: a first layer 312a (introduced first), a second layer 312b, and a third layer 312c (introduced last). Blood vessel 300 includes a main (blood) lumen 305 and an aneurysm 310. Aneurysm 310 includes an aneurysm cavity 315 and an aneurysm neck 330 (in this case a narrow neck) connecting aneurysm cavity 315 to main lumen 305. First layer 312a constitutes some of water-immiscible fluid 320, while third layer 312c constitutes the remainder of water-immiscible fluid 320. Second layer 312b constitutes active agent 360. The three layers are slowly injected continuously, one after the other, such as to form a corresponding three-layered continuous (or substantially continuous) aggregate within blood vessel 300, which slowly advances towards the aneurysm. When first layer 312a reaches aneurysm neck 330, due to the surface tension of water-immiscible fluid 320, first layer 312a does not penetrate into aneurysm cavity 315 and continues advancing along main lumen 305. When second layer 312b reaches aneurysm neck 330, at least some of the active agent (in second layer 312b) is forced/maneuvered into aneurysm cavity 315. The active agent mixes with blood in the aneurysm and a blood clot is induced.

In more detail, FIG. 3A depicts a stage (in an embodiment of method 100) at the end of step 103, wherein blood flow through main lumen 305 has been blocked. FIG. 3B depicts a stage during step 107, wherein a saline infusion (saline solution) is being administered into main lumen 305 (as indicated by an arrow S), such as to dilute the blood in the region (vicinity) of aneurysm 310. FIG. 3C depicts a stage during step 110 and prior to the formation of a meniscus 340 at aneurysm neck 330: First layer 312a is slowly being injected into blood vessel 300 and is shown advancing (as indicated by a dashed-arrow F) within main lumen 305 towards aneurysm neck 330 (which, in FIG. 3C, first layer 312a is yet to reach). Also indicated (by a dotted pattern) is a diluted blood 328 (diluted by the saline infusion administered in step 107).

FIG. 3D depicts a stage during step 120, wherein active agent 360 is being administered, but prior to the arrival of active agent 360 at aneurysm 310 (so that in FIG. 3D there is no presence of the active agent in the aneurysm cavity). Second layer 312b is shown advancing along main lumen 305 towards aneurysm 310. First layer 312a is shown continuing to advance along main lumen 305 without penetrating into aneurysm cavity 315. Also indicated is meniscus 340 formed at aneurysm neck 330. FIG. 3E depicts a stage at the beginning of step 140: Active agent 360 has been forced into aneurysm cavity 315 and mixes with a diluted blood 328' (i.e. the portion of diluted blood 328 which has previously been fluidly-isolated in aneurysm cavity 315 by water-immiscible fluid 320), such as to form a mixture 332 (indicated by the diagonal striped pattern). In FIG. 3E mixture 332 is yet to clot. A reversed-flow of water-immiscible fluid 320 is induced (as indicated by dashed-arrow R) as water-immiscible fluid 320 starts being drawn out of blood vessel 300. FIG. 3F depicts blood vessel 300 after the end of step 140 (i.e. after the treatment has been completed): The active agent-diluted blood mixture has formed a blood clot 334. Water-immiscible fluid 320 has been removed from blood vessel 300 and normal flow of blood has been restored (as indicated by arrow N in main lumen 305).

Reference is now made to FIG. 4, which schematically depicts a catheter 450 for treating an aneurysm 410, which may be similar to aneurysm 210, in a blood vessel 400, which may be similar to blood vessel 200, according to some embodiments. Aneurysm 410 includes an aneurysm cavity 415 and an aneurysm neck 430 fluidly-coupling aneurysm cavity 415 to a main lumen 405 of blood vessel 400. Catheter 450 is a multi-lumen catheter (e.g. a double-lumen catheter). In FIG. 4, aneurysm 415 is fluidly-isolated from main lumen 405 by a barrier 440 formed at aneurysm neck 430 by a water-immiscible fluid 420 previously injected into main lumen 405. Catheter 450 includes a catheter first lumen 452 (e.g. an injection lumen) and a catheter second lumen 454. According to some embodiments, a distal portion of catheter first lumen 452 extends beyond a distal tip 458 of catheter second lumen 454. Catheter first lumen 452 may be configured to allow delivering therethrough an active agent. That is, as depicted in FIG. 4, catheter first lumen 452 may be used to controllably inject the active agent into aneurysm cavity 415. Catheter second lumen 454 may be configured for blood withdrawal. In FIG. 4, the distal portion of catheter first lumen 452 is positioned within aneurysm cavity 415, and distal tip 458 is positioned in aneurysm neck 430, thereby allowing delivery of the active agent into aneurysm cavity 415 and withdrawal of blood from aneurysm neck 430. The length of the distal portion of catheter first lumen 452 (that is, the distance between the distal tip (not numbered) of catheter first lumen 452 and distal tip 458) is selected to be sufficiently large, e.g. between about 5 mm to about 10 mm, such that the active agent administered into aneurysm cavity 415 (via catheter first lumen 452) is not, or substantially not, withdrawn by catheter second lumen 454.

According to some embodiments of catheter 450, and as depicted in FIG. 4, catheter first lumen 452 extends through catheter second lumen 454. According to some such embodiments, catheter first lumen 452 and catheter second lumen 454 are concentrically disposed.

According to some embodiments of the disclosed methods (such as the methods described in FIGS. 1, 8, and 10), and as depicted in FIG. 4, after blood-flow to the aneurysm is blocked by the water-immiscible fluid, the administration of the active agent (indicated by an arrow a) is accompanied by the (simultaneous) withdrawal of blood (indicated by arrows w) from the aneurysm. According to some embodiments, the same, or substantially the same, amount of active agent is delivered into the aneurysm (e.g. via catheter first lumen 452) as the amount of blood withdrawn from the aneurysm (e.g. via catheter second lumen 454). According to some embodiments, the rate of delivery of the active agent into the aneurysm is the same, or substantially the same, as the rate of blood withdrawal from the aneurysm. Simultaneous withdrawal of blood (as described above), may help maintain the integrity of the barrier and/or the positioning thereof in the aneurysm neck (so as to prevent blood flow into the aneurysm cavity) by preventing/limiting increase in pressure in the aneurysm due to the administration of the active agent.

Further, the simultaneous withdrawal of blood may also lead to fluid circulation (or increased fluid circulation) in the aneurysm cavity (e.g. aneurysm cavity 415) and consequently to the mixing of the active agent, thereby helping to ensure formation of a large blood clot(s) instead of small and localized blood clots. It is noted that small and localized blood clots may not provide adequate occlusion of the aneurysm (e.g. aneurysm 410). According to some embodiments, accompanying the administration of the active agent by withdrawal of blood may also help ensure that the administration of the active agent does not cause the aneurysm cavity to rupture.

According to some embodiments, catheter 450 further includes a third lumen (not shown) configured for delivering and/or removing water-immiscible fluid 420.

Figure 5A:
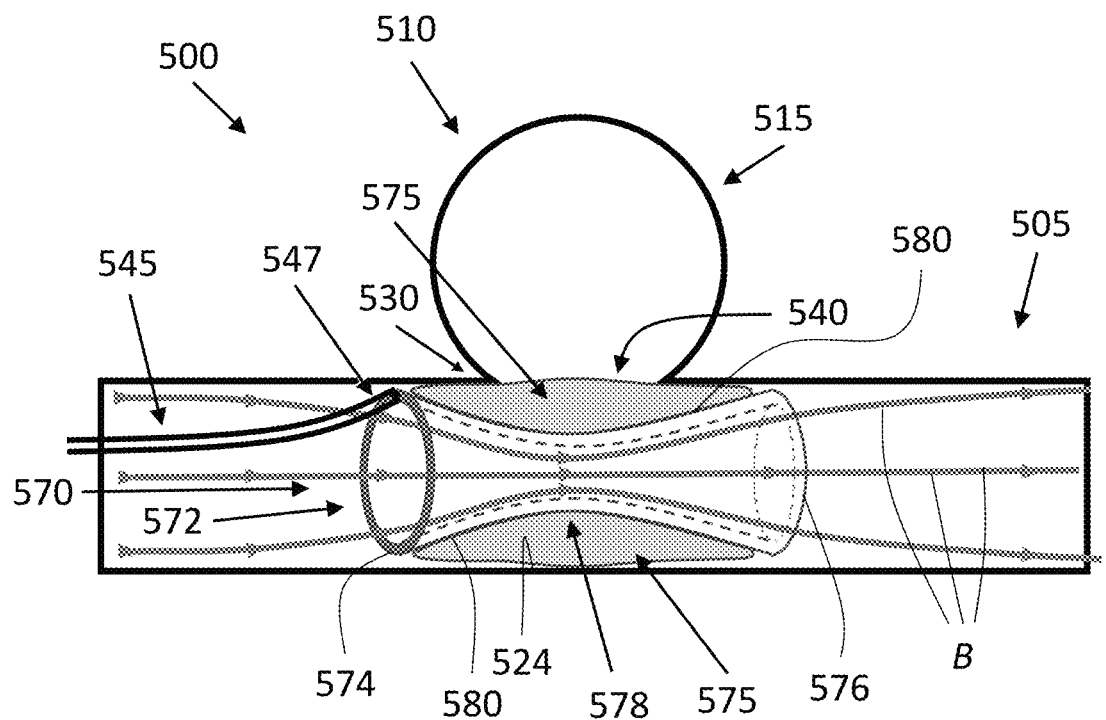
FIG. 5A schematically depicts an open-ended deployable member, configured to allow flow of blood therethrough, the deployable member is mounted within a blood vessel adjacently to an aneurysm, such as to define with walls of the blood vessel a pocket there between, which is shown filled with a water-immiscible fluid, according to some embodiments.
Figure 5B:
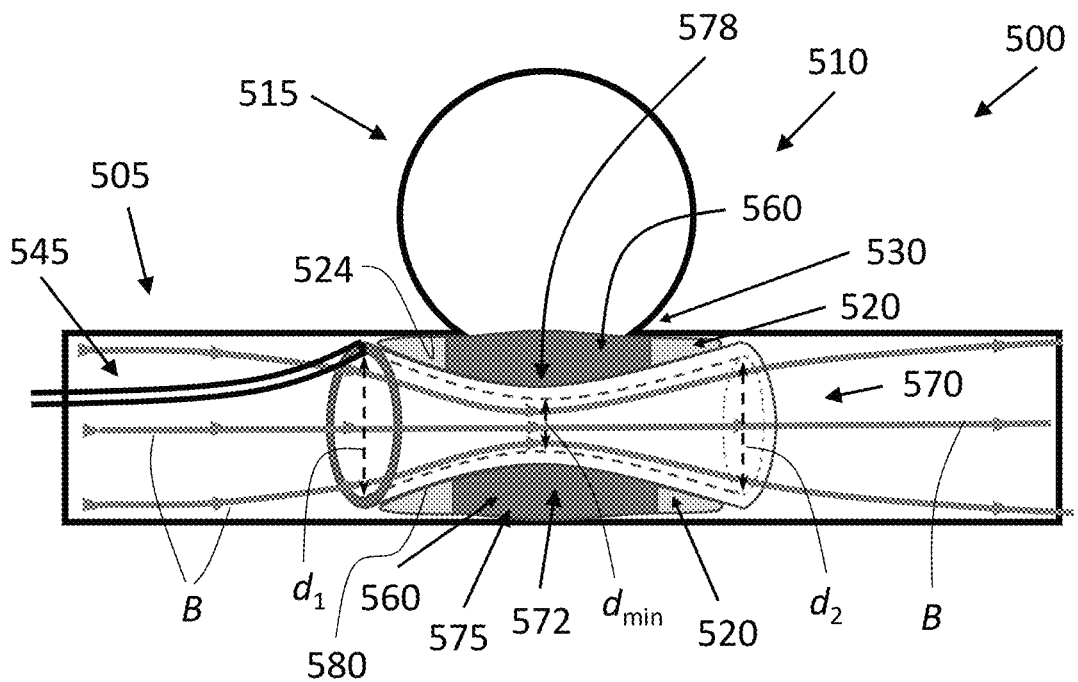
FIG. 5B schematically depicts the deployable member of FIG. 5A with the pocket shown additionally containing an active agent, which penetrates into an aneurysm neck of the aneurysm, according to some embodiments.

Reference is now made to FIGS. 5A and 5B, which schematically depict a deployable member 570 mounted (deployed, installed) within a blood vessel 500, according to some embodiments. Blood vessel 500 may be similar to blood vessels 200 and 300 and includes a main lumen 505 and an aneurysm 510. Aneurysm 510 includes an aneurysm cavity 515 and an aneurysm neck 530.

Deployable member 570 includes a hollow body 572 extending from a first edge 574 to a second edge 576. Hollow body 572 is configured to allow flow of blood therethrough, specifically, when deployable member 570 is installed within a blood vessel, as indicated by blood-flow lines B in FIGS. 5A and 5B, and as described herein below. Thus, the blocking of blood flow through the blood vessel (as required, for example, in blood vessels wherein the blood flow is fast) is rendered unnecessary.

First edge 574 and second edge 576 may be round or substantially round. A diameter $d_2$ (indicated by a dashed double-headed arrow in FIG. 5B) of second edge 576 may be equal to, or substantially equal to, a diameter $d_1$ (indicated by a dashed double-headed arrow in FIG. 5B) of first edge 574. An intermediate section 578 of hollow body 572 is characterized by a diameter $d_{min}$ (indicated by a dashed double-headed arrow in FIG. 5B), which is smaller than each of diameters $d_1$ and $d_2$. According to some embodiments, hollow body 572 is hourglass-shaped or substantially hourglass-shaped. According to some embodiments, the distance between first edge 574 and second edge 576 is at least about twice the characteristic length of aneurysm neck 530 (e.g. a diameter of aneurysm neck 530 when circular or the length of a major axis of aneurysm neck 530 when elliptical) in order to ensure that the formed meniscus (i.e. meniscus 540) (i) prevents the water-immiscible fluid from penetrating into the aneurysm cavity and (ii) prevents fluid (e.g. blood, the active agent, mixture of blood with the active agent) from escaping the aneurysm cavity (i.e. aneurysm cavity 515).

More generally, hollow body 572 is shaped such that when properly (correctly) mounted within a blood vessel (e.g. main lumen 505), hollow body 572 and walls of the blood vessel (e.g. walls 524 of main lumen 505) define there between a pocket (a volume, a space). FIGS. 5A and 5B depict a pocket 575, defined between a surface 580 of hollow body 572 and walls 524. Pocket 575 is shaped such as to allow trapping therein of a water-immiscible fluid 520. Pocket 575 is large enough to accommodate an amount of water-immiscible fluid sufficient to form a barrier at an aneurysm neck, as explained below. According to some embodiments, the diameters $d_1$ and $d_2$ may be such that first edge 574 and second edge 576 fully contact or press into the wall of the blood vessel, thereby sealing pocket 575. According to some embodiments, the diameters $d_1$ and $d_2$ may be such that at least one of first edge 574 and second edge 576 does not contact or does not fully contact the wall of the blood vessel, but any gap(s) there between (due to the surface tension of the water-immiscible fluid) does not allow for escape, or substantial escape, of water-immiscible fluid from the pocket. It will be understood that different embodiments of hollow body 572 may differ in size according to the diameter of the blood vessel.

According to some embodiments, deployable member 570 may further include a catheter 545 (e.g. an injection/suction tube). Catheter 545 may be attached at a distal tip portion 547 thereof to first edge 574, such as to allow injecting a water-immiscible fluid 520 into pocket 575 (i.e. when deployable member 570 is properly mounted within main lumen 505 such as to define pocket 575). In FIG. 5A pocket 575 is shown filled with water-immiscible fluid 520 injected thereinto via catheter 545. According to some embodiments, water-immiscible fluid 520 may be air or $CO_2$, being thereby configured to fluidly-isolate aneurysm cavity 515 by forming a meniscus 540 at aneurysm neck 530. The water-immiscible fluid may be injected slowly so as to help guarantee that the water-immiscible fluid does not fragment into two or more separate bubbles.

According to some embodiments, the water-immiscible fluid may be selected such as not to adhere to walls 524, thereby allowing to maneuver deployable member 570 along the blood vessel (e.g. main lumen 505) to the vicinity of the target site, also when pocket 575 is filled with the water-immiscible fluid. According to some such embodiments, a viscosity of the water-immiscible fluid may be sufficiently low to facilitate the maneuvering, so that deployable member 570 essentially glides on the water-immiscible fluid. According to some such embodiments, the water-immiscible material is gas.

According to some embodiments, for example, in larger embodiments of the deployable member (configured to be mounted within blood vessels of large diameters), the water-immiscible fluid may be characterized by a higher viscosity (for example, when the water-immiscible fluid is oil), or a higher surface tension (for example, when water-immiscible fluid is a liquid metal such as gallium), being thereby configured to resist changes to the spatial configuration thereof (e.g. the annular shape assumed by the water-immiscible fluid about the hollow body in the pocket), for example, due to gravity when the blood vessel in the vicinity of the target site (and therefore the deployable member), is horizontally oriented, or substantially horizontally oriented.

The injection of water-immiscible fluid 520 into pocket 575 may be followed by injection of an active agent 560 (via catheter 545) into pocket 575, followed by yet a second injection of water-immiscible fluid 520. By a suitable selection of the amounts of the water-immiscible fluid and the active agent delivered in each of the three injections, the active agent may be forced into aneurysm cavity 515. More precisely, active agent 560 may be maneuvered into a spatial configuration wherein the active agent surrounds intermediate section 578, penetrates into aneurysm 510, and is in turn surrounded by water-immiscible fluid 520, as shown in FIG. 5B. Advantageously, this ensures that active agent 560 mixes only, or at least substantially only, with blood (not indicated) in aneurysm 510, thereby increasing the efficacy of the induced clotting of the blood within aneurysm 510.

According to some embodiments, hollow body 572 may be flexible and/or malleable. According to some embodiments, hollow body 572 may be made of plastic. According to some embodiments, deployable member 570 may be biodegradable.

It is noted that deployable member 570 may be used for treating not only aneurysms but also other diseased sites within a blood vessel, so long as the diseased sites do not include a portion which significantly projects from the blood vessel wall into the blood vessel (as would be the case in when the diseased site is formed by a large deposit). The use of deployable member 570 ensures that the active agent acts only at, or at the vicinity of, the target site (and does not come into contact with other parts of the blood vessel, e.g. during the administration thereof), which may be advantageous, for example, when providing chemotherapy or gene therapy to a target site.

Figure 6:
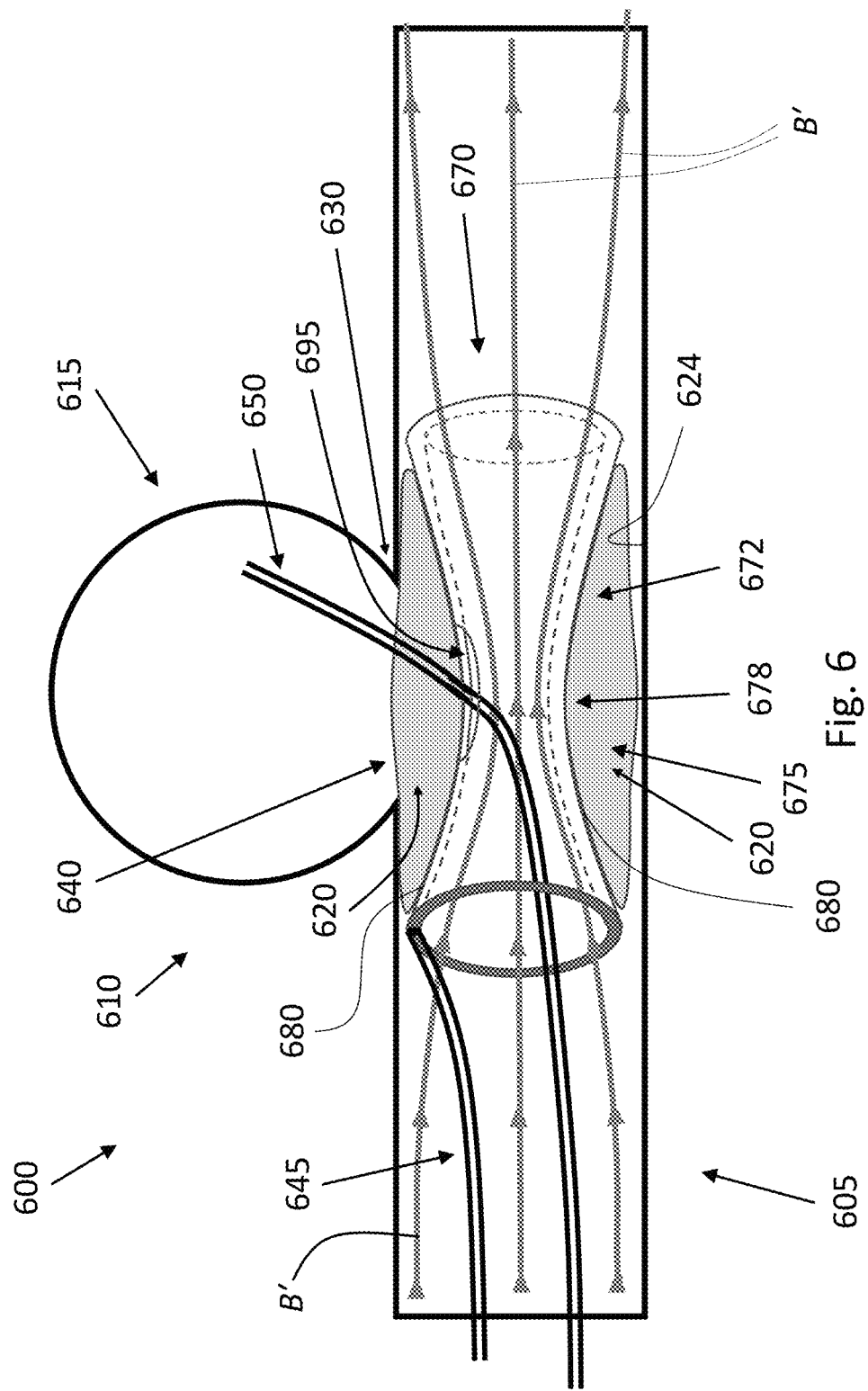
FIG. 6 schematically depicts a deployable member similar to the deployable member of FIG. 5A but differing therefrom in additionally including a catheter insertion port, the deployable member is shown mounted within a blood vessel adjacently to an aneurysm, such as to define with walls of the blood vessel a pocket there between, which is shown filled with a water-immiscible fluid, additionally shown is a catheter extending through the catheter insertion port and the water-immiscible fluid into the aneurysm, according to some embodiments.

FIG. 6 schematically depicts a deployable member 670 mounted within a blood vessel 600 adjacently to an aneurysm 610 in blood vessel 600, according to some embodiments. Blood vessel 600 includes a main lumen 605 and an aneurysm 610. Aneurysm 610 includes an aneurysm cavity 615 and an aneurysm neck 630 fluidly-coupling aneurysm cavity 615 to main lumen 605. Deployable member 670 is similar to deployable member 570 but differs therefrom in additionally including a catheter insertion port 695 in an intermediate section 678 of a hollow body 672 of deployable member 670. Catheter insertion port 695 is configured to have inserted therethrough a catheter, such as a catheter 650 (depicted in FIG. 6). Deployable member 670 is thus configured to allow direct injection of an active agent into aneurysm cavity 615. A water-immiscible fluid 620 may be injected into a pocket 675 (defined between a surface 680 of hollow body 672 and walls 624 of main lumen 605) using a catheter 645 which is essentially similar to catheter 545.

More specifically, by positioning deployable member 670 within main lumen 605, such that catheter insertion port 695 is aligned with aneurysm neck 630, insertion and guidance of catheter 650 into aneurysm cavity 615 (via catheter insertion port 695) is facilitated. According to some embodiments, catheter 650 may be a double-lumen catheter similar to catheter 450 of FIG. 4, thereby additionally allowing to withdraw blood from aneurysm cavity 615 while injecting the active agent thereinto, such as to maintain the position and integrity of barrier 640, essentially as explained in the description of FIG. 4.

Like deployable member 570, deployable member 670 is also configured to allow flow of blood therethrough (when installed within a blood vessel), as indicated by blood-flow lines B' indicated in FIG. 6.

It is noted that, as used herein, according to some embodiments, the terms "deployable member" and "deployable element" may be used interchangeably.

Wide-Neck and Fusiform Aneurysms

The present subsection presents methods and devices for localized treatment of wide-neck and fusiform aneurysms.

As used herein, according to some embodiments, the term "wide-neck aneurysm" refers to an aneurysm having a neck which may be too broad to allow reliable formation of a barrier (e.g. a meniscus) by some of the water-immiscible fluids disclosed herein (e.g. water-immiscible fluid 220). According to some embodiments, the term "fusiform aneurysm" may be used to refer to a wide-neck aneurysm that forms a circumferential, or substantially circumferential, enlargement of the blood vessel (e.g. a 360° enlargement of the blood vessel), as opposed to an enlargement only on one side of the blood vessel (e.g. as depicted, for example, in the FIGS. 2A-2C).

Figure 7A:
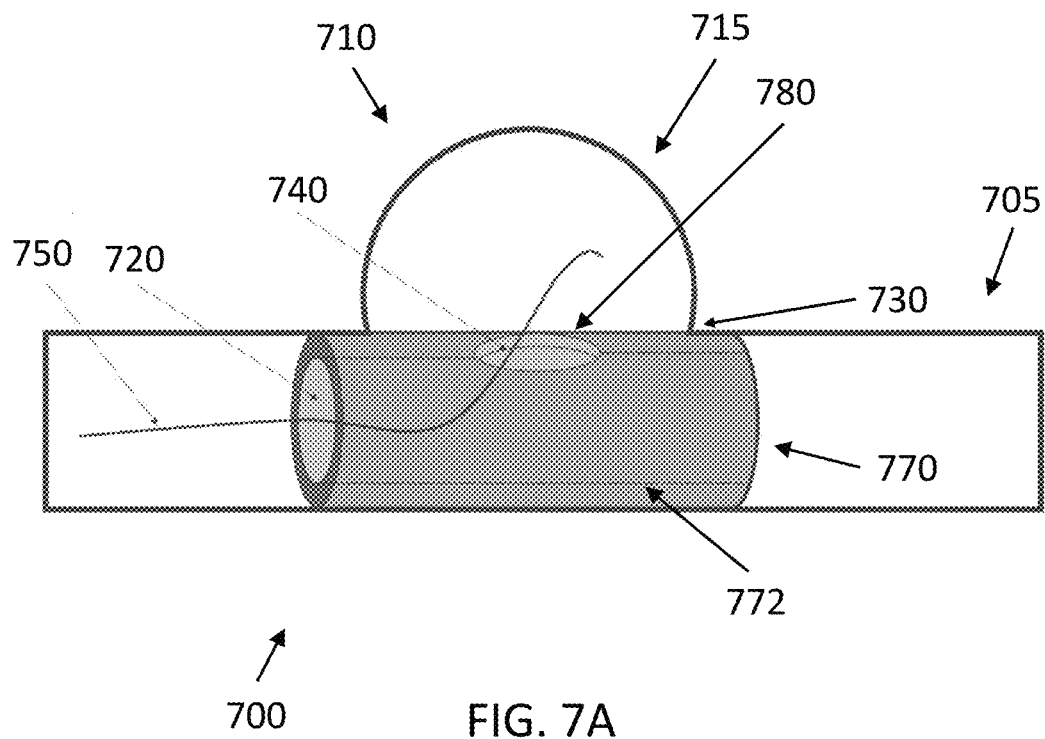
FIG. 7A schematically depicts a deployable element mounted within a blood vessel such as to partially block an aneurysm in the blood vessel and a catheter inserted into the aneurysm via a hole in the deployable element, according to some embodiments.

Reference is now made to FIG. 7A, which schematically depicts a deployable element 770 mounted within a blood vessel 700 such as to partially block a (wide) aneurysm neck 730 of a wide-neck aneurysm 710 in blood vessel 700, according to some embodiments. Deployable element 770 is configured for use in treating wide-neck aneurysms and/or fusiform aneurysms, as explained below. Also depicted is a catheter 750 inserted into wide-neck aneurysm 710 via a hole 780 in deployable element 770. Blood vessel 700 includes a main lumen 705 and wide-neck aneurysm 710. Wide-neck aneurysm 710 includes an aneurysm cavity 715 and (wide) aneurysm neck 730, which fluidly couples aneurysm cavity 715 to main lumen 705.

According to some embodiments, deployable element 770 includes a surface 772 configured to be fitted against a wall of a blood vessel (e.g. a wall of main lumen 705). Surface 772 includes hole 780. Hole 780 may have a smaller typical dimension (e.g. diameter) than a typical dimension (e.g. diameter) of (wide) aneurysm neck 730. According to some embodiments, hole 780 may be circular or elliptical with a typical length (e.g. diameter or major axis of an ellipse) smaller than a typical length of aneurysm neck 730. According to some embodiments, deployable element 770 is rigid or semi-rigid. According to some embodiments, deployable element 770 may be elastic, e.g. when deployable element 770 includes a balloon, as elaborated on below.

Deployable element 770 is configured to allow mounting thereof in main lumen 705 such that (i) surface 772 is adjacent to aneurysm neck 730 and hole 780 is aligned with aneurysm neck 730, and (ii) blood flow between aneurysm cavity 715 and main lumen 705 is possible via hole 780. More specifically, deployable element 770 is configured to allow mounting (deployment) thereof within main lumen 705 with surface 772 being mounted adjacently to (wide) aneurysm neck 730 such as to partially block aneurysm neck 730, and thereby form an effectively narrower neck (defined by hole 780) than (wide) aneurysm neck 730. Surface 772 may be configured to allow partial blockage of wide-neck aneurysm 710 (by partially covering/blocking the cross-section of aneurysm neck 730), such that fluid-communication between main lumen 705 and aneurysm cavity 715 is provided via, and optionally only via, hole 780, as elaborated on below. Hole 780 is configured to facilitate the formation thereat of a barrier (e.g. a meniscus) to blood flow between aneurysm cavity 715 and main lumen 705 by a water-immiscible fluid 720.

According to some embodiments, deployable element 770 may be tube-shaped or substantially tube-shaped. According to some embodiments, surface 772 is cylindrical. According to some embodiments, deployable element 770 is a rigid, semi-rigid, or flexible tube. Each possibility corresponds to separate embodiments. According to some embodiments, deployable element 770 may be a stent (e.g. a stent which includes hole 780).

According to some embodiments, without being bound to any scientific theory, the water-immiscible fluid (present at or in the vicinity of hole 780) may be characterized by a Weber number $We_2$ smaller than 1, wherein $We_2 = \rho_2(v_2)^2 l_2 / \sigma_2$ with $\rho_2$ being the density of water-immiscible fluid 720, $v_2$ being the injection velocity (e.g. into main lumen 705) of water-immiscible fluid 720, $l_2$ is a (largest) characteristic length of hole 780 (e.g. a diameter thereof when hole 780 is round, or a length of the major axis thereof when (a cross-section of) hole 780 is elliptical), and $\sigma_2$ being the surface tension between water-immiscible fluid 720 and the blood.

According to some embodiments of the disclosed methods (such as the method described in FIG. 8), water-immiscible fluid 720 may be administered into main lumen 705 such as to form a barrier 740 (e.g. in the form of a meniscus) at hole 780 and thereby fluidly-isolate aneurysm cavity 715, as depicted in FIG. 7A. The skilled person will understand that the narrower neck formed by hole 780 (relative to aneurysm neck 730) may allow using water-immiscible fluids having a surface tension which may be potentially too low to reliably/effectively block aneurysm neck 730 (but which is nevertheless sufficiently high to reliably block hole 780). The skilled person will also appreciate that in embodiments wherein deployable element 770 is a stent, the surface tension of water-immiscible fluid 720 may also prevent the escape thereof via perforations (other than hole 780), if present, in the stent.

According to some embodiments of the disclosed methods, catheter 750 may be inserted into aneurysm cavity 715 via hole 780 (and via the barrier formed thereat by barrier 740). Catheter 750 may be used to deliver an active agent into aneurysm cavity 715 such as to occlude wide-neck aneurysm 710, essentially as described above in the description of FIGS. 1-2C. According to some embodiments, catheter 750 is a multi-lumen catheter, such as catheter 450 or similar thereto.

According to some embodiments, deployable element 770 may include an inflatable balloon. The balloon is configured such that when inflated, the balloon fits the anatomy of blood vessel 700 in the vicinity of the target site. In particular, the shape assumed by the balloon, when inflated, may be in the form of a cylindrical shell (which, according to some embodiments, scale apart, may resemble an inflated swimming armband), such as to allow administration of water-immiscible fluid 720 thereinto. In such embodiments, hole 780 extends between a first surface of (an internal surface of the cylindrical shell) and a second surface (an external surface of the cylindrical shell), defined by surface 772. According to some embodiments, the balloon may be delivered on a catheter which is also used to inflate the balloon (e.g. with a saline solution), and optionally to deflate the balloon.

According to some embodiments, deployable element 770 may be biodegradable.

Figure 7B:
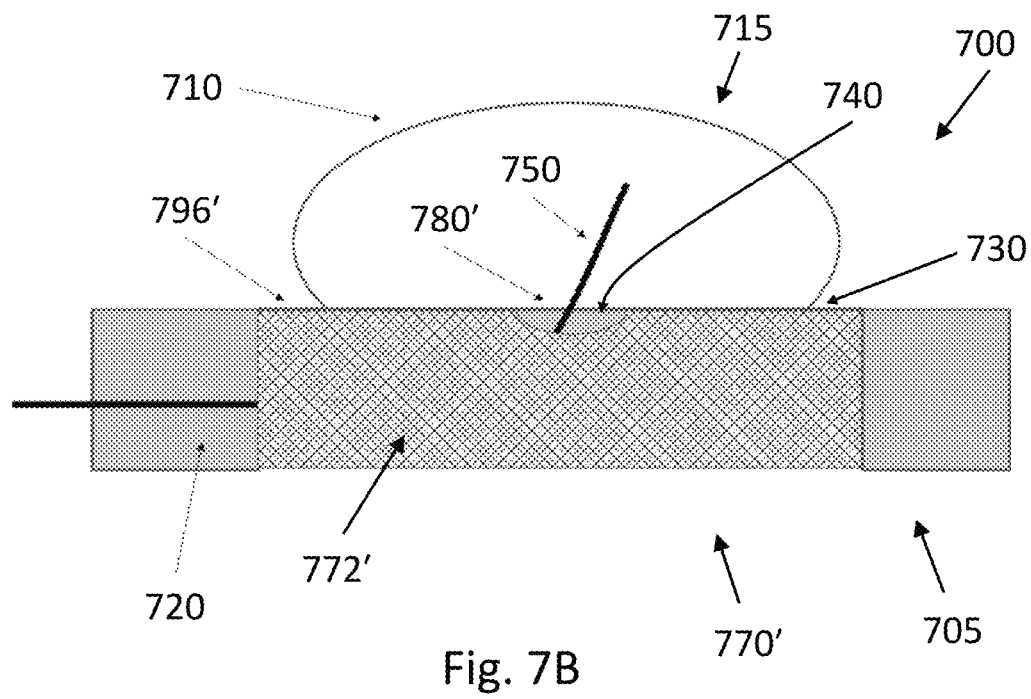
FIG. 7B schematically depicts a specific embodiment of the deployable element of FIG. 7A, wherein the deployable element includes a stent, according to some embodiments.

FIG. 7B schematically depicts a deployable element 770', according to some embodiments. Deployable element 770' is a specific embodiment of deployable element 770. Deployable element 770' includes a stent 796'. Stent 796' defines a surface 772' and includes a hole 780', which are specific embodiments of surface 772 and hole 780, respectively.

Reference is now made to FIG. 8, which presents a flowchart of a method 800 for treating a wide neck/fusiform aneurysm, using a deployable element, such as deployable element 770 (schematically depicted in FIG. 7A) or deployable element 770' (schematically depicted in FIG. 7B). According to some embodiments, method 800 includes:

A step 810 wherein a deployable element (e.g. deployable element 770) is introduced into a section of a blood vessel including a wide-neck aneurysm (e.g. wide-neck aneurysm 710) and guided in the blood vessel to a position adjacent to the aneurysm. The deployable element includes a hole (e.g. hole 780) in a surface (e.g. surface 772) thereof. The surface is configured to be fitted/mounted against (adjacently to) a wall of a main lumen (e.g. main lumen 705) of the blood vessel.

A step 820 wherein the deployable element is positioned such as to align the hole with the neck of the aneurysm, thereby partially blocking the neck and effectively forming a narrower neck, essentially as described in the description of FIGS. 7A and 7B.

A step 830 wherein a water-immiscible fluid (WIF) is delivered to the deployable element, such as to form a barrier to blood flow at the hole (thereby fluidly isolating the cavity of the aneurysm from the main lumen).

A step 840 wherein an active agent is administered into the aneurysm via the hole on the surface of the deployable element (e.g. using a catheter), such as to occlude the aneurysm.

An optional step 850, performed simultaneously or substantially simultaneously to step 840, wherein blood is withdrawn from the aneurysm (e.g. using a multi-lumen catheter such as catheter 450), such as to maintain the integrity of the barrier formed by the water-immiscible fluid.

A step 860 wherein the water-immiscible fluid (and optionally the deployable element) is removed from the blood vessel, and blood flow/full blood flow through the main lumen is restored.

According to some embodiments, in step 810 the deployable element is delivered using a catheter (i.e. the deployable element is mounted on the catheter, which is then inserted into the body and guided onto the site/vicinity of the aneurysm). According to some embodiments, wherein the deployable element is a stent, the catheter is a balloon catheter. According to some such embodiments, the inflation of the balloon is used to expand the deployable element within the main lumen, so as to fix the surface of the deployable element adjacent the walls of the main lumen with the hole being aligned with the neck of the aneurysm.

According to some embodiments, the deployable element may be magnetic, or include a magnetizable material (e.g. a ferromagnet), and in step 810 the deployable magnet may be guided to the vicinity of the target site using magnetic fields.

According to some embodiments, in step 830 the water-immiscible fluid may be delivered essentially as described in the description of step 110 of method 100.

According to some embodiments, step 830 is preceded by a step 825, wherein blood flow through the blood vessel, at least along a section thereof including the aneurysm, is temporarily blocked, essentially as described in step 103 of method 100. According to some embodiments, the blood flow through the blood vessel may be blocked prior to step 820 or even prior to step 810. In particular, according to some embodiments wherein the blood flow through the blood vessel is blocked prior to step 810, step 830 may be performed simultaneously with step 810. That is, the water-immiscible fluid may be delivered to the deployable element (e.g. into the deployable element when the deployable element is a tube or tube-like shaped) prior to the guiding of the deployable element to the site/vicinity of the aneurysm (so that the deployable element is guided to the site/vicinity of the aneurysm with the water-immiscible fluid). It is noted that in embodiments including blocking of the blood flow through the vessel, step 860 will further include removing the blocking of the blood flow through the blood vessel.

According to some embodiments, in step 840 the active agent may be administered into the aneurysm, essentially as described in the description of step 120 of method 100. According to some embodiments, the active agent is administered using a catheter inserted through the hole (and via the barrier formed by the water-immiscible fluid) into the aneurysm.

According to some embodiments, in step 850 blood may be withdrawn from the aneurysm, essentially as described in the description of step 130 of method 100. According to some embodiments, the blood is withdrawn using a catheter inserted through the hole (and via the barrier formed by the water-immiscible fluid) into the aneurysm. According to some embodiments, the catheter is a multi-lumen catheter and is the same catheter used in step 840.

According to some embodiments, in step 860 the water-immiscible fluid may be removed from the blood vessel, essentially as described in the description of step 140 of method 100. According to some embodiments, the deployable element is also removed. According to some alternative embodiments, the deployable element is not removed (for example, when the deployable element is biodegradable).

Figure 9:
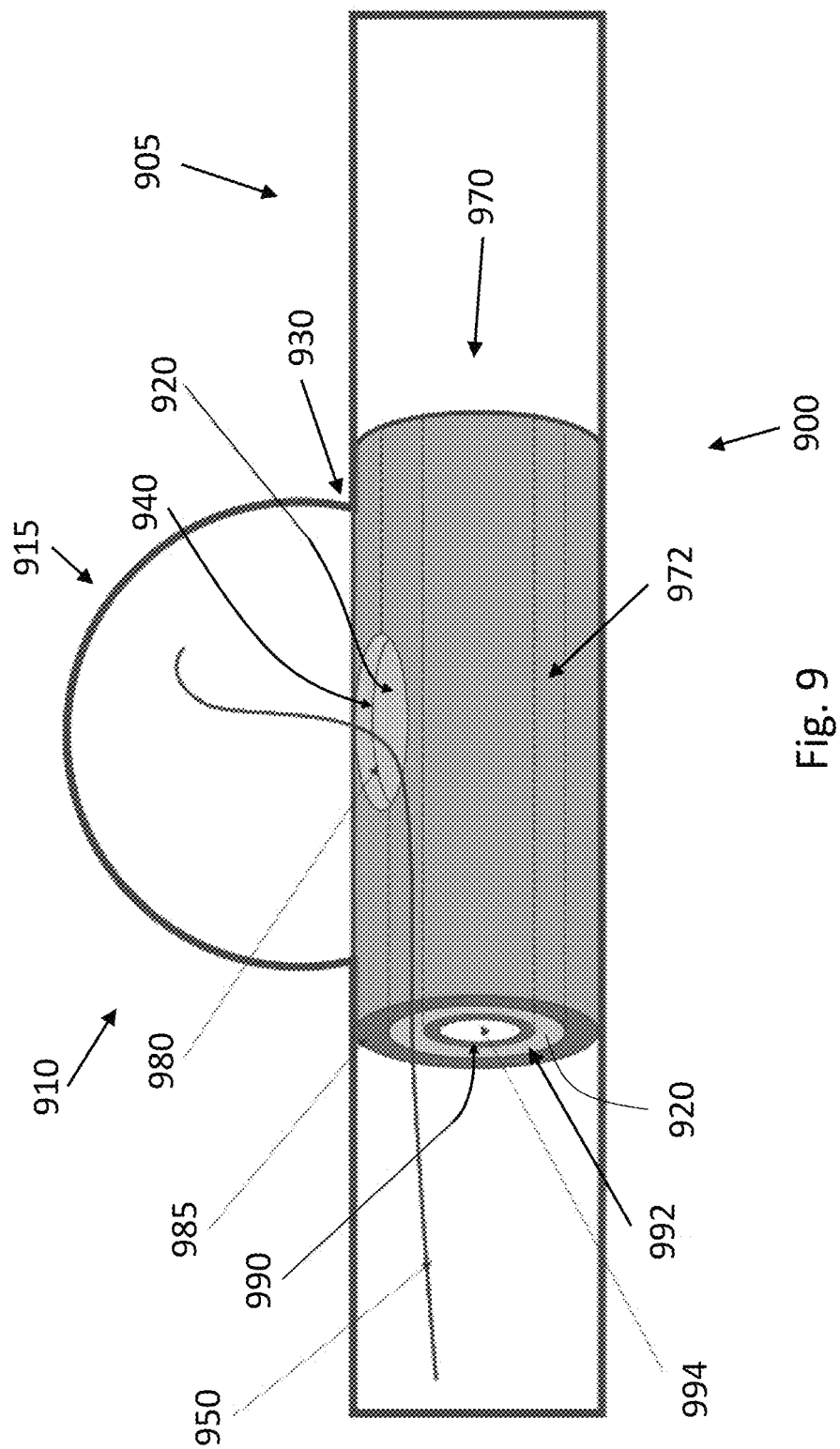
FIG. 9 schematically depicts a deployable element including an outer tube-like member and an inner tube-like member disposed along a length of the outer tube-like member, the deployable element being mounted within the blood vessel, such that the outer tube-like member partially blocks a neck of an aneurysm in the blood vessel, and a catheter is inserted into the aneurysm via a gap between the tube-like members and via a hole in the outer tube-like member, according to some embodiments.

Reference is now made to FIG. 9, which schematically depicts a deployable element 970 mounted/deployed within a blood vessel 900, according to some embodiments. Blood vessel 900 includes a main lumen 905 and a wide-neck aneurysm 910. Wide-neck aneurysm 910 includes an aneurysm cavity 915 and a (wide) aneurysm neck 930. Deployable element 970 is configured for use in treating wide-neck aneurysms and/or fusiform aneurysms, as explained below.

Deployable element 970 includes an outer tube-like member 985 (e.g. a cylindrical, or substantially cylindrical, member) and an inner tube-like member 990 disposed within outer tube-like member 985 along a length thereof. Outer tube-like member 985 and inner tube-like member 990 define a gap 992 there between. Outer tube-like member 985 includes a hole 980 on a circumferential surface 972 of outer tube-like member 985. Hole 980 may be circular or elliptical with a typical length (e.g. diameter) smaller than a typical length of aneurysm neck 930. As shown in FIG. 9, by positioning deployable element 970 adjacently to wide-neck aneurysm 910, such that a cross-section of aneurysm neck 930 is partially blocked by deployable element 970 and such that hole 980 is aligned with aneurysm neck 930, a narrower neck (defined by hole 980) is effectively formed.

According to some embodiments of the disclosed methods (such as the method described in FIG. 10), a water-immiscible fluid 920 may be administered into gap 992 such as to form a barrier 940 (e.g. in the form of a meniscus) at hole 980 and thereby fluidly-isolate aneurysm cavity 915, as depicted in FIG. 9. Inner tube-like member 990 is configured such that water-immiscible fluid 920, delivered into gap 992, does not enter into inner tube-like member 990 (e.g. the surface of inner tube-like member 990 may be unperforated, or if, perforated, contains only perforations sufficiently small to prevent water-immiscible fluid 920 from penetrating penetrate), so that blood flow through main lumen 905 is not blocked (or not fully blocked) by deployable element 970 (blood may continue to flow through an inner lumen 994 of inner tube-like member 990). According to some embodiments, a catheter 950 may be inserted into aneurysm cavity 915 via gap 992 and hole 980 (and via the meniscus formed thereat by barrier 940). Catheter 950 may be used to deliver an active agent into aneurysm cavity 915 such as to occlude wide-neck aneurysm 910, essentially as described above in the description of FIGS. 1-2C. According to some embodiments, catheter 950 may be a multi-lumen catheter, such as catheter 450.

According to some embodiments, each of tube-like members 985 and 990 is a rigid, semi-rigid, or flexible tube. Each possibility corresponds to separate embodiments. According to some embodiments, each of tube-like members 985 and 990 is a stent.

According to some embodiments, each of tube-like members 985 and 990 is an inflatable stent. Outer tube-like member 985 may be essentially similar to the inflatable balloon embodiments of deployable element 770. Inner tube-like member 990 may be also be similar to the inflatable balloon embodiments of deployable element 770, except for not including a hole (i.e. a side-hole such as hole 780) and being shaped such as to be accommodated within outer tube-like member 985.

According to some embodiments, deployable element 970 may be biodegradable.

Reference is now made to FIG. 10, which presents a flowchart of a method 1000 for treating a wide neck/fusiform aneurysm in a blood vessel while allowing continuous blood flow in the blood vessel. According to some embodiments, method 1000 includes:

A step 1010 wherein a deployable element (e.g. deployable element 970) is introduced into a section of a blood vessel including a wide-neck aneurysm (e.g. wide-neck aneurysm 910). The deployable element includes an outer tube-like member (e.g. outer tube-like member 985) and an inner tube-like member (e.g. inner tube-like member 990) disposed along a length of the outer tube-like member. The outer tube-like member includes a hole (e.g. hole 980) on a circumferential surface (e.g. circumferential surface 972) thereof. The outer tube-like member and the inner tube-like member define a gap there between (e.g. gap 992).

A step 1020 wherein the deployable element is positioned such as to align the hole with the neck of the aneurysm, thereby partially blocking the neck and effectively forming a narrower neck, essentially as described in the description of FIG. 9.

A step 1030 wherein a water-immiscible fluid (WIF) is delivered into the gap in the deployable element (between the tube-like members), such as to form a barrier to blood flow at the hole (thereby fluidly isolating the cavity of the aneurysm from the main lumen). Continuous blood flow through the main lumen is maintained via the inner tube-like member.

A step 1040 wherein an active agent is administered into the aneurysm via the hole on the surface of the deployable element (e.g. using a catheter), such as to occlude the aneurysm.

An optional step 1050, performed simultaneously or substantially simultaneously to step 1040, wherein blood is withdrawn from the aneurysm (e.g. using a multi-lumen catheter such as catheter 450), such as to maintain the integrity of the barrier formed by the water-immiscible fluid.

A step 1060 wherein the water-immiscible fluid (and optionally the deployable element) is removed from the blood vessel, and blood flow/full blood flow through the main lumen is restored.

According to some embodiments, in step 1010 the deployable element is delivered using a catheter. According to some embodiments, the deployable element may be magnetic, or include a magnetizable material, and in step 1010 the deployable magnet may be guided to the vicinity of the target site using magnetic fields.

According to some embodiments, step 1030 is preceded by a step 1025, wherein blood flow through the blood vessel, at least along a segment thereof including the aneurysm, is temporarily blocked, essentially as described in step 103 of method 100. According to some embodiments, the blood flow through the blood vessel may be blocked prior to step 1020 or even prior to step 1010. In particular, according to some embodiments wherein the blood flow through the blood vessel is blocked prior to step 1010, step 1030 may be effected simultaneously with step 1010. That is, the water-immiscible fluid may be delivered into the deployable element prior to the guiding of the deployable element to the site/vicinity of the aneurysm (so that the deployable element is guided to the site/vicinity of the aneurysm with the water-immiscible fluid already present in the gap between the tubes. It is noted that in embodiments including blocking of the blood flow through the vessel, step 1060 will further include removing the blocking of the blood flow through the blood vessel.

According to some embodiments, in step 1040 the active agent may be administered into the aneurysm, essentially as described in the description of step 120 of method 100. According to some embodiments, the active agent is administered using a catheter inserted through the gap and the hole (and via the barrier formed by the water-immiscible fluid) into the aneurysm.

According to some embodiments, in step 1050 blood may be withdrawn from the aneurysm, essentially as described in the description of step 130 of method 100. According to some embodiments, the blood is withdrawn using a catheter inserted through the gap and the hole (and via the barrier formed by the water-immiscible fluid) into the aneurysm. According to some embodiments, the catheter is a multi-lumen catheter and is the same catheter used in step 1040.

According to some embodiments, in step 1060 the water-immiscible fluid may be removed from the blood vessel, essentially as described in the description of step 140 of method 100.

Methods and Devices for Providing Localized Treatment in a Blood Vessel

While the methods and devices of FIGS. 1-10 are directed to the treatment of aneurysms, the scope of the present disclosure is more expansive, covering the provision of localized treatment (at a target site in a blood vessel) addressing other vascular conditions and diseases. More precisely, the present disclosure teaches how to temporarily fluidly-isolate a diseased region in a blood vessel from the blood circulation, thereby creating an environment conducive for providing localized treatment at the region, as explained herein below.

Figure 11:
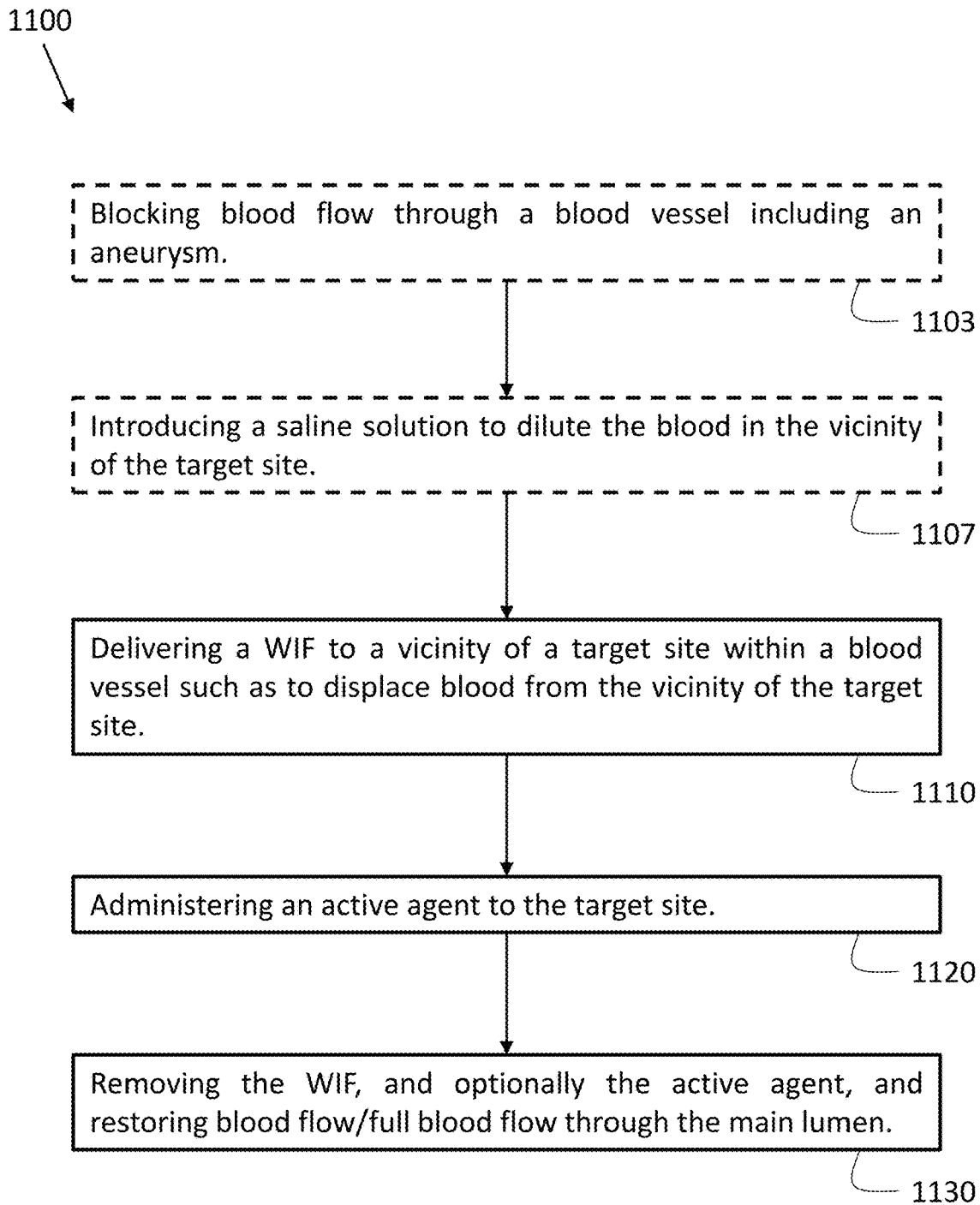
FIG. 11 presents a flowchart of a blood displacement-based method for providing localized treatment to a target site in a blood vessel, according to some embodiments.

Making reference to FIG. 11, FIG. 11 is a flowchart of a method 1100 for providing localized treatment to a target site in a blood vessel. Method 1100 generalizes method 100 to the provision of localized treatment for other localized conditions in a blood vessel beyond aneurysms. Similarly to method 100, method 1100 also relies on surface-tension-based blood displacement. Method 1100 includes:

A step 1110 wherein a water-immiscible fluid (WIF) is delivered to a vicinity of a target site within a blood vessel such as to displace blood from the vicinity of the target site.

A step 1120 wherein an active agent is administered (delivered) to the target site.

A step 1130 wherein the water-immiscible fluid is removed from the blood vessel, and blood flow/full blood flow through the main lumen is restored.

According to some embodiments, step 1110 is preceded by a step 1103, wherein blood flow through the blood vessel, at least along a section thereof including the target site, is (temporarily) blocked. Step 1103 may be effected, for example, by inserting a balloon catheter into the blood vessel upstream of the target site and inflating the balloon, essentially as explained in the description of FIG. 1.

According to some embodiments, step 1110 may be preceded by a step 1107, wherein the blood in vicinity of the target site is diluted by a saline solution (saline infusion) or a viscoelastic fluid, e.g. essentially as described in the description of step 107 of method 100.

According to some embodiments, a catheter, optionally a multi-lumen catheter such as catheter 450, may be used to inject the water-immiscible fluid and/or the active agent into the blood vessel. According to some such embodiments, further incorporating step 1103, the injection of the water-immiscible fluid may be accompanied by withdrawal of blood at the same rate, or substantially the same rate, as that of the injection. Further, the injection of the active agent may be accompanied by withdrawal of blood and/or water-immiscible fluid, for example, as described below in the description of FIGS. 13A-13E.

According to some embodiments, steps 1110 and 1120 may be implemented by a triple-layered (three-layered) injection, essentially as described herein below, for example, in the description of FIGS. 12A-12C (as well as in the descriptions of FIGS. 16A-16E and FIGS. 17A-17C). According to some embodiments, for example, embodiments wherein method 1100 is used to treat full blockage in a blood vessel, steps 1110 and 1120 may be implemented by a double-layered injection, essentially as described below in the description of FIG. 13A-13E.

Blood Vessel Blockage Treatment

Reference is now made to FIGS. 12A-12C, which depict use of an embodiment of method 1100 for removal of a partial blockage in a blood vessel 1200. Blood vessel 1200 includes a stenosed site 1202 (i.e. the target site), e.g. due to a deposit 1218 (e.g. plaque, fat, and/or blood clot), or the formation of a lesion, on a wall 1224 of blood vessel 1200. Also indicated is a region 1204 (vicinity of the target site) around, and including, stenosed site 1202.

In FIGS. 12A-12C, a water-immiscible fluid 1220 and an active agent 1260 are introduced into blood vessel 1200 in a three-layered injection: A first layer 1212a is introduced (injected) first, followed by a second layer 1212b, and a third layer 1212c (introduced last). First layer 1212a constitutes some of water-immiscible fluid 1220, while third layer 1212c constitutes the rest of water-immiscible fluid 1220. Second layer 1212b constitutes active agent 1260. The three layers are slowly and continuously injected one after the other, such as to form a corresponding three-layered continuous (or substantially continuous) aggregate within blood vessel 1200, which slowly advances towards the stenosed site 1202. Dashed arrows F' in FIG. 12B indicate the direction of the advance of three injected layers Active agent 1260 is configured to dissolve deposit 1218. For example, when deposit 1218 is a blood clot, active agent 1260 may be a clot-dissolving drug (e.g. a thrombolytic drug), or, when deposit 1218 is an accumulation of fat, active agent 1260 may be tPA, plasmin, or any other blood clot lysis agent. As mentioned above, second layer 1212b is confined between first layer 1212a and third layer 1212c. In other words, water-immiscible fluid 1220 isolates active agent 1260 from the blood in blood vessel 1200, and thereby advantageously prevents the dilution thereof. Further, since the isolation of the active agent eliminates the risk of systemic spreading (of the active agent), significantly higher (local) concentrations of the active agent may be used, which would otherwise (i.e. without isolation) be dangerous to the subject.

FIG. 12A depicts blood vessel 1200 prior to the implementation of the embodiment of method 1100. FIG. 12B depicts a stage in the implementation corresponding to steps 1110 and 1120 of method 1100. Blood flow through blood vessel 1200 has been blocked, e.g. using a balloon (not shown) located upstream of stenosed site 1202. First layer 1212a has been injected (e.g. using a catheter which is not shown) and the water-immiscible fluid in first layer 1212a has reached stenosed site 1202 and continues advancing downstream, that is, away from the balloon. Second layer 1212b is currently being injected and is advancing toward stenosed site 1202. FIG. 12C depicts a stage in the implementation after the completion of steps 1110 and 1120 (but prior to step 1130): Third layer 1212c has been injected and the continuous aggregate of the three injected layers has advanced along blood vessel 1200 such that active agent 1260 is positioned at stenosed site 1202 and surrounds deposit 1218. Active agent 1260 is isolated from blood in blood vessel 1200 by water-immiscible fluid 1220 in first layer 1212a and in second layer 1212b, and, as such, can continuously act on deposit 1218 without undergoing systemic spreading (diffusion), thereby significantly increasing the effectiveness of the treatment. Once the desired effect of the active agent has been achieved, the water-immiscible fluid and the active agent may be sucked out via the catheter and normal blood flow through blood vessel 1200 may be restored.

Reference is now made to FIGS. 13A-13E, which depict use of an embodiment of method 1100 for removal of a full blockage in a blood vessel 1300. Blood vessel 1300 includes an occluding target 1318 (e.g. formed by a deposit such as plaque or a blood clot) at a target site 1302. Also indicated is an occlusion vicinity 1304 (vicinity of the target site) of target site 1302. Occlusion vicinity 1304 includes target site 1302 and a neighboring region upstream of target site 1302.

In FIGS. 13A-13E, a water-immiscible fluid 1320 and an active agent 1360 are introduced into blood vessel 1300 in a double-layered-injection: A first layer 1312a is injected first, followed by an injection of a second layer 1312b. First layer 1312a constitutes water-immiscible fluid 1320. Second layer 1312b constitutes active agent 1360, which is configured to dissolve occluding target 1318. A balloon catheter 1355 is used to fluidly-isolate occlusion vicinity 1304 (balloon catheter 1355 is positioned upstream of occluding target 1318). Balloon catheter 1355 is a double-lumen catheter and includes a (double-lumen) catheter tube 1356 and a balloon 1358. A catheter tip 1362 (formed by a first lumen of the two lumens of catheter tube 1356; the two lumens of catheter tube 1356 are not distinguished in the figures) is positioned proximately to (or even such as to contact) occluding target 1318. First layer 1312a is injected (e.g. via the first lumen of catheter tube 1356) while blood (not indicated) is simultaneously withdrawn from occlusion vicinity 1304, via the second lumen of catheter tube 1356, at the same, or substantially the same rate that water-immiscible fluid 1320 is injected. Next, second layer 1312b is slowly injected. Simultaneously, some of water-immiscible fluid 1320 (from first layer 1312a) and blood, if remaining, are withdrawn from occlusion vicinity 1304—at the same rate, or substantially the same rate, as the active agent is injected-resulting in a spatial configuration of injected fluids such that active agent 1360 is positioned adjacently to, and upstream of, occluding target 1318, and water-immiscible fluid 1320 is positioned adjacently to, and upstream of, active agent 1360.

Active agent 1360 is left to act on occluding target 1318. Once the desired effect is attained (i.e. occluding target 1318 starts dissolving), water-immiscible fluid 1320 and active agent 1360 may be sucked out via catheter 1355, and balloon 1358 is deflated to allow blood flow through blood vessel 1300.

FIG. 13A depicts blood vessel 1300 fully occluded prior to the beginning of the implementation of the described embodiment of method 1100. FIG. 13B depicts a stage in the implementation after step 1103, wherein catheter 1355 has been introduced and occluding vicinity 1304 has been fluidly-isolated (by the inflation of balloon 1358). FIG. 13C depicts a stage in the implementation corresponding to the end of step 1110, wherein water-immiscible fluid 1320 has been introduced into occluding vicinity 1304 and blood has been withdrawn therefrom. FIG. 13D depicts a stage in the implementation corresponding to the end of step 1120, wherein active agent 1360 has been administered to target site 1302. FIG. 13E depicts a stage in the implementation corresponding to a point after the end of step 1120 but prior to step 1130, wherein active agent 1360 is left to act at target site 1302 dissolving occluding target 1318 (as indicated by the diagonal stripes pattern).

Generalization to Internal Body Passages Beyond Blood Vessels

The skilled person will understand that the concepts behind the disclosed methods and devices readily lends itself to generalization which encompasses provision of localized treatment in internal body passages (physiological lumens/ducts/tracts), other than blood vessels, wherein fluids, and in particular biofluids other than blood, may be present.

Thus, according to an aspect of some embodiments, there is provided a method for providing localized treatment at a target site in an internal body passage of a subject. The method includes:

Delivering to a vicinity of a target site in an internal body passage including a biofluid, an immiscible fluid which is immiscible with the biofluid. The immiscible fluid is delivered such as to displace the biofluid from the vicinity of the target site.

Administering (delivering) an active agent to the target site. The active agent is immiscible with the (delivered) immiscible fluid, or substantially immiscible therewith. The active agent is administered such as to be trapped by the immiscible fluid.

According to some embodiments, the internal body passage is a lymphatic vessel, the target site is malignant tumor or a lymph node, the biofluid is lymph, the immiscible fluid is a water immiscible fluid (and is therefore immiscible with lymph), and the active agent includes chemotherapy or anti-inflammatory drugs and is immiscible with the immiscible fluid. In particular, the active agent may include a drug used for treating cancer, thereby obviating the necessity of lymph node removal (which is current standard practice), which may lead to lymphedema or other types of lymph blockages.

According to some embodiments, the method further includes, prior to delivering the immiscible fluid, blocking flow of the biofluid to the vicinity of the target site. According to some such embodiments, the blocking of the flow of the biofluid to the vicinity of the target site is effected using a balloon catheter.

According to some embodiments, the method further includes, subsequently to the administering of the active agent, removing the immiscible fluid, and, optionally the active agent, from the internal body passage.

According to some embodiments, the active agent includes a drug.

According to some embodiments, the active agent includes a nucleic acid. The method being is configured for providing gene therapy at the target site.

According to some embodiments, the active agent includes an anticancer drug targeting a cancerous cell growth at the target site. The method is thereby configured to treat the cancerous cell growth.

According to some embodiments, the method further includes delivering the immiscible fluid and the active agent in a three-layered injection. A first layer (injected first) includes a first portion of immiscible fluid. A second layer (injected second) includes the active agent. A third layer (injected last) includes a second portion of the immiscible fluid. The three layers are injected continuously one after the other such that the second layer, which is positioned between the first layer and the third layer, is maneuvered, at least in part, thereby (i.e. by the first layer and the third layer) to the target site.

The skilled person will understand that similar devices to deployable member 570 may be used to provide localized treatment in an internal body passage.

According to some an aspect of some alternative embodiments used for localized treatment in passageways in the respiratory system, no immiscible fluid is necessary. Instead the active agent is configured to be immiscible with fluids naturally present in the respiratory system. According to some such embodiments, the internal body passage is a passageway (e.g. a bronchial passageway, an alveolar duct) in the respiratory system, the target site is a cancerous tumor or a genetic manipulation site (e.g. for treatment of cystic fibrosis), the biofluid is air or $CO_2$ (here, "biofluid" is used in a broad sense to cover also inhaled fluids essential to the function of the human body, such as air) and the active agent is immiscible with the biofluid and includes a drug used for treating cancer or genetic transcription factors in an aqueous solution. In order not to prevent or obstruct breathing, a device such as, or similar to, deployable member 570 may be used to deliver the active agent to the target site.

Experimental Results

This section presents proof-of-concept results from a number of experimental simulations, which demonstrate the feasibility of the disclosed methods.

Experimental Modeling of Aneurysms

FIGS. 14A-14F present photos of an experimental set up simulating an implementation of method 100, according to some embodiments thereof. The photos depict successive stages in the implementation. Three liquid phases were used to model blood, a water-immiscible fluid, and an active agent. FIG. 14A depicts a pipe 1400 filled with a (colored) saline solution 1409, which models (experimentally simulates) a blood vessel (e.g. blood vessel 200), and blood-flow therein, according to some embodiments, and prior to the administration of the water-immiscible fluid (in this case oil). Pipe 1400 includes a main lumen 1405 and has mounted thereon an aneurysm-like structure 1410 including a cavity 1415 and a neck 1430, which may, for example, model main lumen 205, aneurysm 210, aneurysm cavity 215, and aneurysm neck 230, respectively, of FIGS. 2A-2C.

FIG. 14B depicts pipe 1400 with a water-immiscible fluid 1420 (being transparent and therefore not visible but indicated by arrows) inserted into pipe 1400 such as to form a barrier 1440 (e.g. a meniscus) at neck 1430. Regions of pipe 1400 wherein (blood-simulating) saline solution 1409 is present are darker than regions of pipe 1400 wherein water-immiscible fluid 1420 is present. More specifically, in FIG. 14B the (blood-simulating) saline solution 1409 is present substantially only in cavity 1415, and main lumen 1405 is filled with water-immiscible fluid 1420. Barrier 1440 is thus seen to restrict liquid flow between main lumen 1405 and cavity 1415, thereby fluidly isolating cavity 1415 from main lumen 1405. The outline of pipe 1400 is indicated in FIG. 14B by a pair of (curved) dashed lines to facilitate distinguishing pipe 1400 from the surroundings thereof.

In FIG. 14C, a catheter 1450 is shown inserted through the water-immiscible fluid and into cavity 1415. It is noted that barrier 1440 is not broken up/fragmented by the insertion of catheter 1450.

In FIG. 14D, an active agent 1460 (a glue agent) is present in aneurysm-like structure 1410 (here, active agent 1460 is distinguished from (blood-simulating) saline solution 1409 by being darker as compared thereto). Active agent 1460 had been administered by catheter 1450 and is shown accumulated at the bottom of cavity 1415 and/or in neck 1430.

In FIG. 14E, catheter 1450 is not shown, having been removed. Active agent 1460 constitutes a (long-term) barrier preventing flow of (blood-simulating) saline solution 1409 between main lumen 1405 and cavity 1415.

In FIG. 14F, water-immiscible fluid 1420 has been removed from pipe 1400 and flow of the (blood-simulating) saline solution along main lumen 1405 is restored (while cavity 1415 remains fluidly isolated).

FIGS. 15A-15D present photos of an experimental set up simulating an implementation of method 100, according to some embodiments thereof. The photos present successive stages in the implementation. A pipe 1500 and an aneurysm-like structure 1510 were used to model a blood vessel including an aneurysm. Pipe 1500 includes a main lumen 1505 and has mounted thereon aneurysm-like structure 1510 which includes a cavity 1515 and a neck 1530 (which fluidly couples the cavity to the main lumen). Three phases were used to model blood, a water-immiscible fluid, and an active agent: water 1509, air 1520, and a dye 1560, respectively.

Figure 15A:
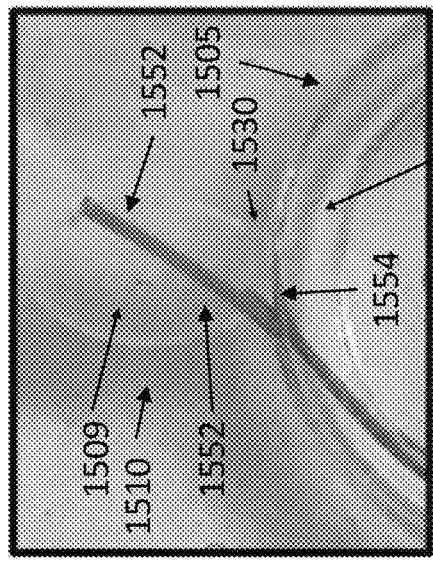
FIGS. 15A-15D present successively taken photos of an experimental set up simulating treatment of an occlusion of an aneurysm in a blood vessel using direct injection of an active agent into the aneurysm, according to an embodiment of the method of FIG. 1.

FIG. 15A depicts a stage in the simulation corresponding to the end of step 110, according to some embodiments of method 100: Main lumen 1505 is filled with air 1520 and cavity 1515 is filled with water 1509 (simulating blood in the aneurysm cavity). Air 1520 forms a meniscus 1540 at neck 1530.

Figure 15B:
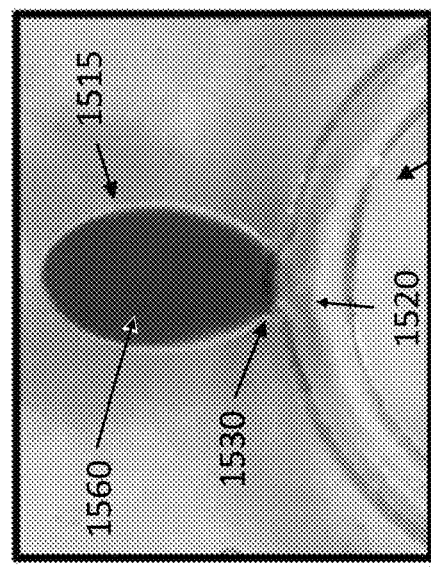

FIG. 15B depicts a stage in the simulation corresponding to the beginning of step 120, according to some embodiments of method 100: A pair of catheters has been inserted into cavity 1515 via meniscus 1540, which retains the integrity thereof: a first catheter 1552 (used for injection of the active agent) and a second catheter 1554 (used for suction). In the figures, second catheter 1554 is mostly hidden from view by first catheter 1552. The tip (not numbered) of second catheter 1554 is positioned at neck 1530.

Figure 15C:
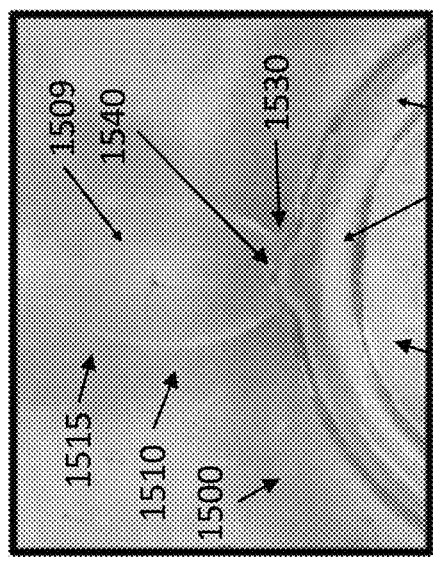

FIG. 15C depicts a stage in the simulation corresponding to an intermediate point in step 120, according to some embodiments of method 100: Dye 1560 is being injected into cavity 1515, via first catheter 1552, while the water from cavity 1515 is simultaneously being sucked out therefrom via second catheter 1554.

Figure 15D:
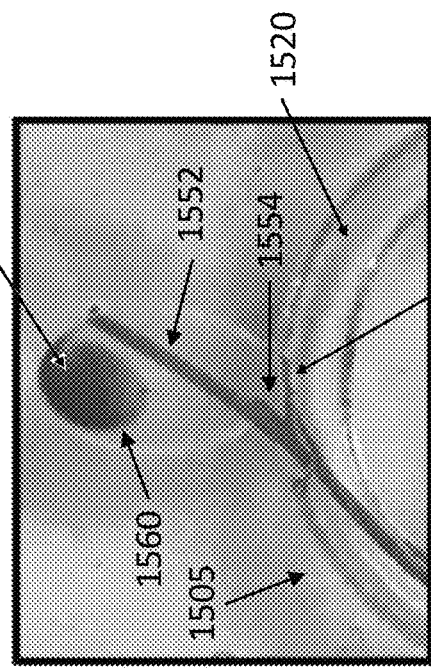

FIG. 15D depicts a stage in the simulation corresponding to the end of step 120, according to some embodiments of method 100: Dye 1560 has been fully injected into cavity 1515 and is restricted to cavity 1515 by the air in main lumen 1505.

FIGS. 16A-16E present photos of an experimental set up simulating an implementation of method 100, according to some embodiments thereof. The photos depict successive stages in the implementation. A water-immiscible fluid and an active agent are injected in three successive layers, essentially as described hereinabove in the description of FIGS. 3A-3F.

A pipe 1600 and an aneurysm-like structure 1610 were used to model a blood vessel including an aneurysm. Pipe 1600 includes a main lumen 1605 and has mounted thereon aneurysm-like structure 1610 which includes a cavity 1615 and a neck 1630 (which fluidly couples the cavity to the main lumen). Three liquid phases were used to model blood, a water-immiscible fluid, and an active agent: a red-dyed water 1609, an oil 1620, and a green-dyed water 1660, respectively.

Figure 16A:
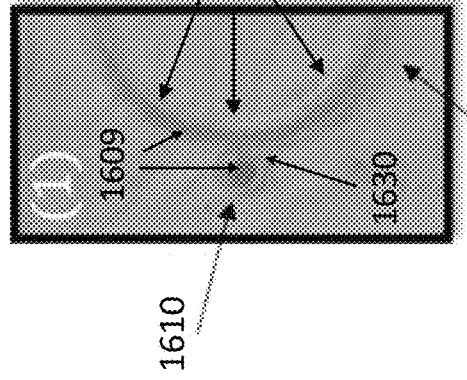
FIGS. 16A-16E present successively taken photos of an experimental set up simulating treatment of an occlusion of an aneurysm in a blood vessel using a three-layered injection into the blood vessel, according to an embodiment of the method of FIG. 1.

FIG. 16A depicts pipe 1600 and aneurysm-like structure 1610 prior to the beginning of the simulated treatment: Red-dyed water 1609 (simulating blood) flows freely through main lumen 1605 and is present in cavity 1615.

Figure 16B:
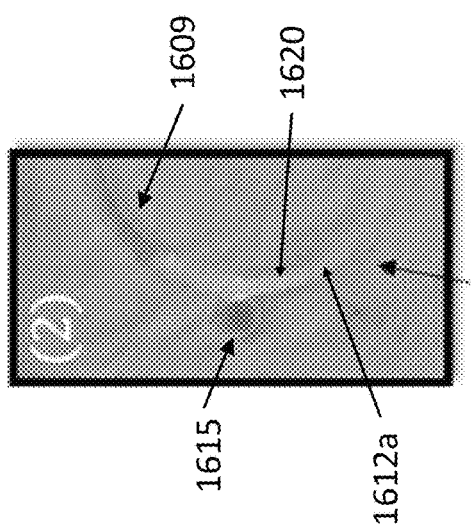

FIG. 16B depicts a stage in the simulation corresponding to the end of step 110, according to some embodiments of method 100: "Blood" flow through main lumen 1605 has been stopped (blocked). A first layer 1612*a*, constituted by some of oil 1620, has been injected into main lumen 1605, such as to displace red-dyed water 1609 from a region 1604 of main lumen 1605 adjacent to cavity 1615, thereby trapping some of red-dyed water 1609 inside cavity 1615.

Figure 16C:
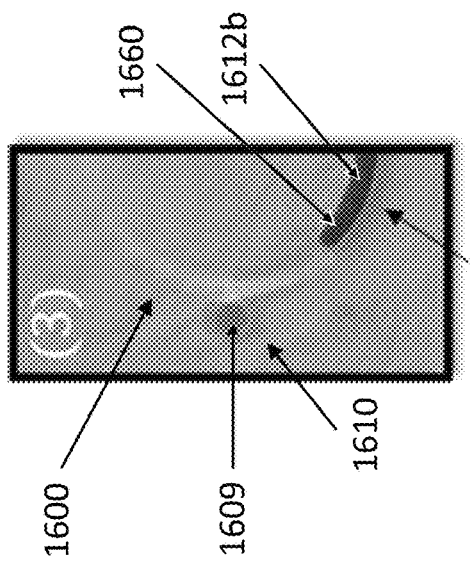

FIG. 16C depicts a stage in the simulation corresponding to the beginning of step 120, according to some embodiments of method 100: A second layer 1612*b*, constituted by green-dyed water 1660 (which simulates the active agent), is being injected into cavity main lumen 1605, and is yet to reach neck 1630.

Figure 16D:
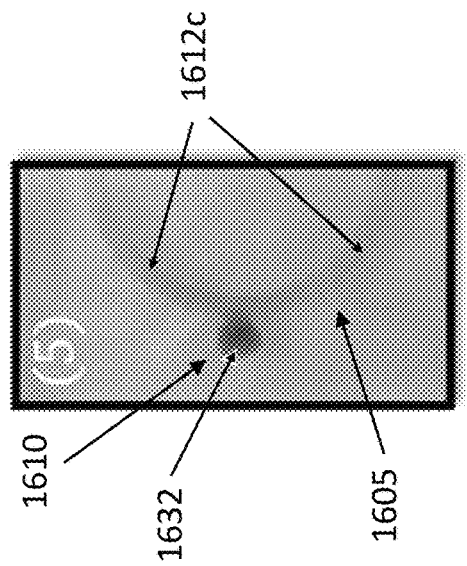

FIG. 16D depicts a stage in the simulation corresponding to the end of step 120, according to some embodiments of method 100: A third layer 1612*c*, constituted by the remainder of oil 1620, has been injected into main lumen 1605, such as to maneuver green-dyed water 1660 to region 1604 as well as into cavity 1615. Consequently, a mixture 1632 of the "active agent" and "blood" is formed, which is fluidly-isolated from the "blood circulation" by first layer 1612*a* and third layer 1612*c*.

Figure 16E:
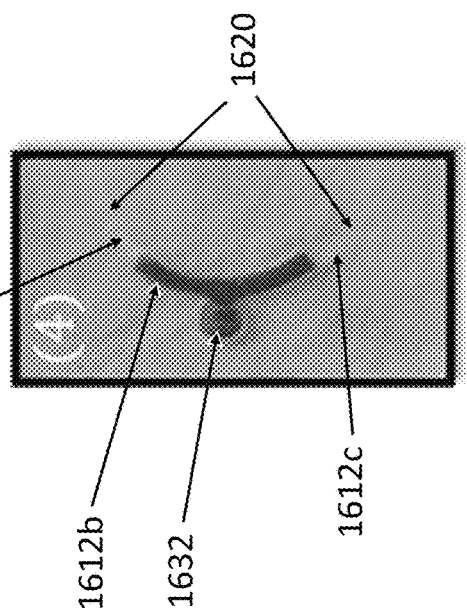

FIG. 16E depicts a stage in the simulation corresponding to the end of step 140, according to some embodiments of method 100: the oil and the "active agent", which was present in main lumen 1605, have been withdrawn, leaving the mixture the of the "active agent" and the "blood" (i.e. mixture 1632) within cavity 1615.

Experimental Modeling of Stenosis/Narrowing

Figure 17A:
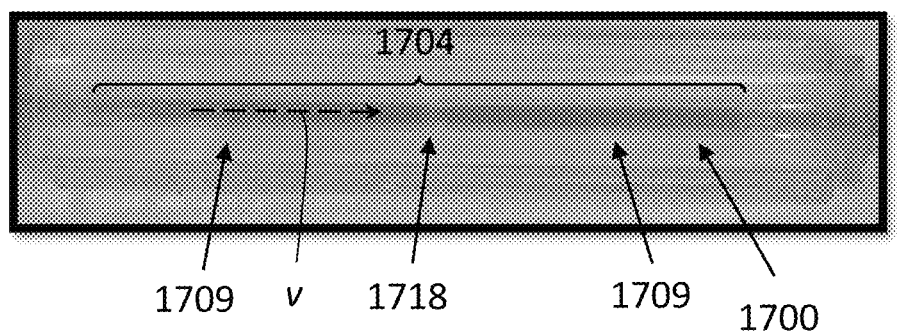
FIGS. 17A-17C present successively taken photos of an experimental set up simulating treatment of stenosis in a blood vessel, according to an embodiment of the method of FIG. 11.
Figure 17B:
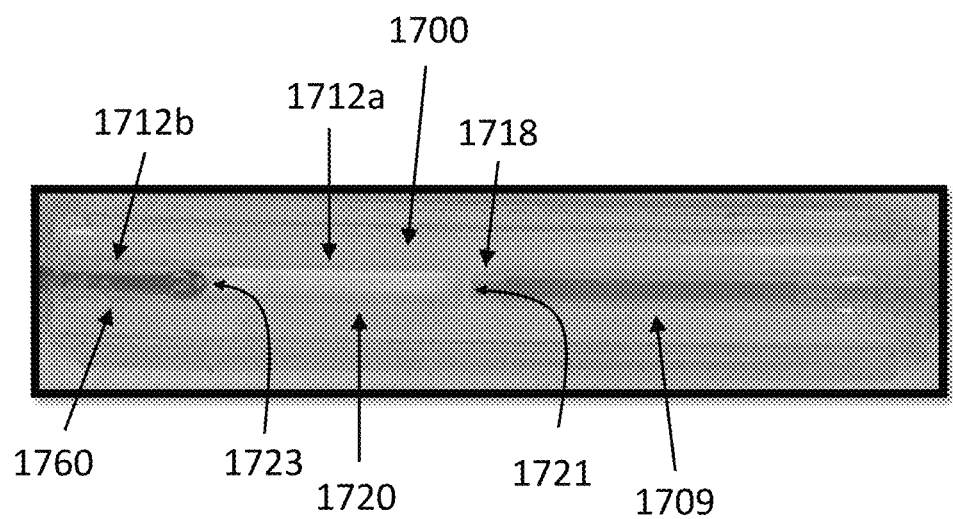
Figure 17C:
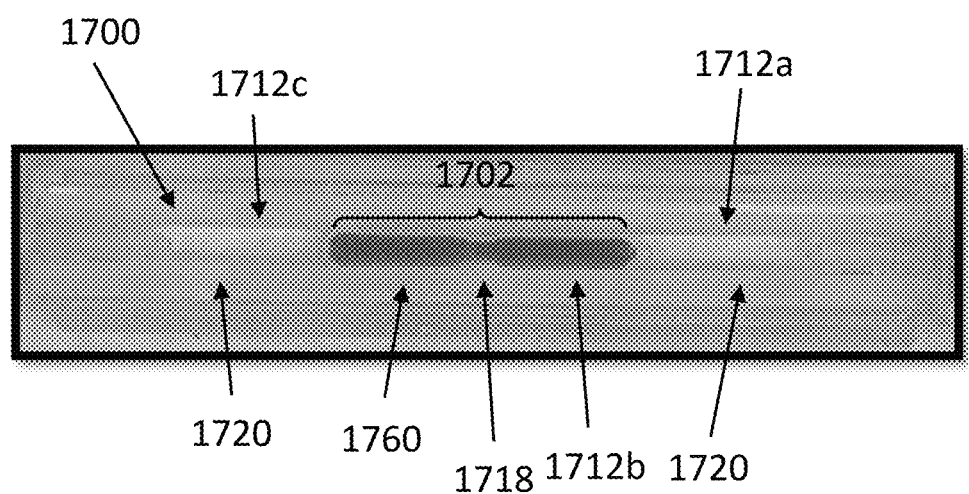

FIGS. 17A-17C present photos of an experimental set up simulating treatment of a partial blockage in a blood vessel using an implementation of method 1100, according to some embodiments thereof. The photos depict successive stages in the implementation. More specifically, the photos depict transport (maneuvering) of an isolated phase (active agent) to a partial occlusion site (stenosis/narrowing). A water-immiscible fluid and an active agent are injected in three successive layers, essentially as described hereinabove in the description of FIGS. 12A-12C.

A pipe 1700 (e.g. a tube), simulating a stenosed blood vessel, is depicted. Pipe 1700 includes a narrowed segment 1718 simulating stenosis at a target site 1702 in pipe 1700. Also indicated is a pipe section 1704 (vicinity of the target site), surrounding and including target site 1702.

FIG. 17A depicts pipe 1700 prior to the beginning of the simulated treatment. Flow of "blood" (simulated by a colored saline solution 1709) is indicated by a dashed arrow v.

FIG. 17B depicts a stage in the simulation corresponding to a midpoint of steps 1110 and 1120 (whose implementations overlap), according to some embodiments of method 1100: "Blood" flow through pipe section 1704 has been blocked. A front 1721 of a first injected layer 1712*a*, which simulates a first portion of an (injected) water-immiscible fluid 1720 (in this case paraffin oil), is shown arriving at narrowed segment 1718. A second injected layer 1712*b*, which simulates an active agent 1760 (in this case dyed water), is shown advancing towards narrowed segment 1718, with a front 1723 of second injected layer 1712*b* being adjacent to first injected layer 1712*a*.

FIG. 17C depicts a stage in the simulation corresponding at the end of step 1120 (whose implementation overlaps with step 1110), according to some embodiments of method 1100: A third injected layer 1712*c*, which simulates a second portion of water-immiscible fluid 1720, has been injected, such as to maneuver second injected layer 1712*b* to target site 1702, so that active agent 1760 is present at narrowed segment 1718, and is fluidly-isolated thereat by first injected layer 1712*a* and third injected layer 1712*c*.

This section is concluded by noting that results from other experimental simulations demonstrated the capacity of water-immiscible fluids to form substantially stable and continuous phases/medium in a blood vessel which withstand blood pulsations. In particular, the experimental simulations demonstrated the capacity of water-immiscible fluids to form a stable meniscus in the neck of the aneurysm which is able to withstand variations in pressure due to blood pulsations.

FURTHER DESCRIPTIONS OF EMBODIMENTS

In the following, further descriptions of above-described embodiments are provided, as well as additional and alternative embodiments.

According to an aspect of some embodiments, there is provided a method (e.g. method 1100, and, in the case of aneurysms, also methods 100, 800, and 1000) for providing localized treatment at a target site in a blood vessel of a subject. The method includes:

Delivering to a vicinity of a target site in a blood vessel a water-immiscible fluid such as to displace blood from the vicinity of the target site.

Administering (i.e. delivering) an active agent to the target site, the active agent being mutually immiscible with the water-immiscible fluid.

Due to the mutual immiscibility of the water-immiscible fluid and blood, the delivery of the water-immiscible fluid drives away the blood from the vicinity of the target site. Using the fact that the water-immiscible fluid and the active agent are mutually immiscible, or substantially mutually immiscible, the active agent is delivered to the target site in such a way as to be trapped (and fluidly-isolated) by the water-immiscible fluid.

It will be understood that the step of administering the active agent to the target site covers also embodiments wherein the active agent is introduced into the blood vessel at a location other than the target site (e.g. upstream of the target site) and then maneuvered to the target site, as elaborated on below.

As used herein, according to some embodiments, the terms "delivering" and "administering" may be used interchangeably.

According to some embodiments, the target site is a diseased site.

According to some embodiments, the method further includes, prior to the delivering of the water-immiscible fluid, blocking blood flow through the blood vessel at least at the vicinity of the target site. According to some embodiments, the blocking is effected upstream of the target site. According to some embodiments, the blocking of the blood flow to the blood vessel is effected using a balloon catheter.

According to some embodiments, the method further includes, prior to the delivering the water-immiscible fluid, diluting blood in the vicinity of the target site with a saline solution and/or a viscoelastic fluid.

According to some embodiments, the method further includes, subsequently to the administering of the active agent, removing the water-immiscible fluid from the blood vessel. According to some such embodiments, the active agent is also removed from the blood vessel.

As used herein, according to some embodiments, the term "active agent" may refer to a molecule, compound, composition, or substance configured to act at/on the target site.

According to some embodiments, the active agent includes a drug. According to some embodiments, the drug may include an anti-inflammatory agent, an antibiotic(s), a growth factor, and/or any combination thereof. According to some embodiments, the active agent may be used for cell therapy. According to some embodiments, the active agent includes nucleic acid configured to provide gene therapy at the target site. According to some embodiments, the target site includes a cancerous cell growth and the active agent includes an anticancer drug targeting a cancerous cell growth. According to some embodiments, the target site constitutes a stenosed region of the blood vessel, and/or a stricture in the blood vessel, and the active agent includes one or more substances configured to treat the stenosis and/or the stricture. According to some embodiments, the target site includes a deposit (e.g. a blood clot, fat, and/or plaque) and/or a lesion, and the active agent includes one or more substances configured to dissolve the deposit and/or the lesion.

According to some embodiments, the water-immiscible fluid forms a substantially stable and continuous phase/medium in the blood vessel. According to some embodiments, the continuous phase/medium is configured not to break up due to blood pulsations.

According to some embodiments, the water-immiscible fluid is, or includes, insoluble/hydrophobic material(s) having a surface tension greater than that of blood.

According to some embodiments, the surface tension of the water-immiscible fluid compared to water is in the range of 30 mN/m to 80 mN/m at a temperature of 20° C. According to some embodiments, the surface tension of the water-immiscible fluid compared to water is in the range of 40 mN/m to 80 mN/m at a temperature of 20° C. According to some embodiments, the surface tension of the water-immiscible fluid compared to water is in the range of 30 mN/m to 70 mN/m at a temperature of 20° C. According to some embodiments, the surface tension of the water-immiscible fluid compared to water is in the range of 40 mN/m to 70 mN/m at a temperature of 20° C.

According to some embodiments, the water-immiscible fluid includes one or more of oil, dimethyl sulfoxide, ethylene glycol, propylene carbonate, toluene, fluorocarbon, mercury, gallium. According to some such embodiments, the oil is, or includes, poppy oil.

According to some embodiments, the water-immiscible fluid is a gas. According to some such embodiments, the gas is, or includes, air or $CO_2$.

According to some embodiments, the water-immiscible fluid is biocompatible.

According to some embodiments, the water-immiscible fluid and the active agent are delivered in a three-layered injection: A first injected layer (first layer) includes a first portion of the water-immiscible fluid, a second injected layer (second layer) includes the active agent, and a third injected layer (third layer) includes a second portion of the water-immiscible fluid. The three injected layers are injected continuously one after the other such that the second injected layer, which is positioned between the first injected layer and the third injected layer, is maneuvered, at least in part, thereby (i.e. by the two other injected layers) to the target site.

As used herein, according to some embodiments, the terms "first injected layer" and "first layer" with reference to sequence of injected layers, may be used interchangeably, and refer to the earliest injected layer. Similarly, according to some embodiments, the terms "second injected layer" and "second layer" with reference to injected layers, may be used interchangeably and refer to the second-earliest injected layer. Finally, according to some embodiments, the terms "third injected layer" and "third layer" with reference to injected layers, may be used interchangeably and refer to the third-earliest injected layer.

According to some embodiments, wherein the target site forms a full blockage of the blood vessel, the delivering of the water-immiscible fluid and the administering of the active agent are effected by a two-layered injection: A first injected layer (first layer) includes the water-immiscible fluid, and a second injected layer (second layer) includes the active agent (which is configured to dissolve the blockage). The two injected layers are injected continuously one after the other such as to fluidly-isolate the second injected layer between the blockage and the first injected layer.

According to some embodiments, the method (e.g. methods 100, 800, and 1000) is configured for treating an aneurysm. According to some such embodiments, the blood vessel includes a main lumen and an aneurysm including an aneurysm cavity and an aneurysm neck positioned between the main lumen and the aneurysm cavity. The target site may include the aneurysm cavity and the vicinity of the target site may include the aneurysm neck. According to some embodiments, the method (e.g. methods 800 and 1000) is configured for treating wide-neck and/or fusiform aneurysms.

In such embodiments, in the step of delivering the water-immiscible fluid, the water-immiscible fluid may be delivered such as to form a barrier to blood flow at the aneurysm neck, thereby fluidly isolating the aneurysm cavity from the main lumen. In the step of administering an active agent, the active agent, or at least a portion thereof, may be delivered into the aneurysm. The active agent may be configured to form, or to induce a formation of, a blood clot in the aneurysm cavity.

According to some such embodiments, the surface tension of the water-immiscible fluid may be such as to prevent the water-immiscible fluid from penetrating into the aneurysm cavity through the aneurysm neck.

According to some embodiments, the blood clot formed by the active agent is located in the aneurysm cavity at or about the aneurysm neck. According to some embodiments, the water-immiscible fluid forms a meniscus at the aneurysm neck. The meniscus constitutes the barrier.

According to some such embodiments, the active agent may be directly administered into the aneurysm cavity (e.g. using a catheter inserted into the aneurysm cavity as described below).

According to some embodiments, simultaneously, or substantially simultaneously, to the administering of the active agent administration, blood is withdrawn from the aneurysm, such as to prevent build-up of excessive pressure in the aneurysm, thereby acting to maintain the integrity and positioning of the barrier. According to some such embodiments, a rate of the blood withdrawal is equal, or substantially equal, to a rate of the administration of the active agent.

According to some embodiments, in the step of administering the active agent, the active agent is administered using a catheter, which is inserted into the aneurysm cavity through the barrier formed by the water-immiscible fluid.

According to some embodiments, the water-immiscible fluid and the active agent are delivered in a three-layered injection: A first injected layer (first layer) includes a first portion of the water-immiscible fluid, a second injected layer (second layer) includes the active agent (which may be configured to induce a blood clot), and a third injected layer (third layer) includes a second portion of the water-immiscible fluid. The three injected layers are injected continuously one after the other such that the second injected layer, which is positioned between the first injected layer and the third injected layer, or at least a portion of the second injected layer, is maneuvered by the first injected layer and the third injected layer into the aneurysm cavity.

According to some embodiments, the method further includes inserting into the main lumen a deployable element (e.g. deployable elements 770 and 970). The deployable element is hollow and includes a hole on a surface thereof. The hole has a smaller diameter than a diameter of the aneurysm neck. The deployable element is mounted in the blood vessel such that the surface of the deployable element is adjacent to the aneurysm neck and the hole is aligned with the aneurysm neck, thereby facilitating the formation by the water-immiscible fluid of the barrier at the hole when the water-immiscible fluid is delivered thereto.

According to some embodiments, the deployable element is, or includes, a (first) tube-like member. The tube-like member is configured to receive thereinto the water-immiscible fluid. The hole is located on a (circumferential) shell of the tube-like member. The surface is defined by the shell.

According to some embodiments, the hole is configured to allow insertion therethrough of a catheter configured to administer the active agent. According to some embodiments, the catheter is inserted prior to the delivering of the water-immiscible fluid. According to some alternative embodiments, the catheter is inserted subsequently to the delivering of the water-immiscible fluid.

According to some embodiments, the tube-like member is, or includes, a rigid, semi-rigid, or flexible tube. Each possibility corresponds to separate embodiments. According to some embodiments, the tube-like member is, or includes, a stent. According to some embodiments, the tube-like member is, or includes, an inflatable balloon.

According to some embodiments, the deployable element further includes a second tube-like member extending inside and along the first tube-like member. The tube-like members are configured to receive into a gap there between the water-immiscible fluid. The (inner) second tube-like member is configured to facilitate blood flow therethrough (when the deployable element is properly installed within the main lumen). According to some such embodiments, the gap is configured to allow insertion therethrough of a catheter (which is inserted into the aneurysm via the hole on the first tube-like member and used to administer the active agent).

According to some embodiments, the water-immiscible fluid is delivered, subsequently to the insertion and mounting of the deployable element. According to some alternative embodiments, the water-immiscible fluid is delivered together with the deployable element.

According to some embodiments, the first tube-like member is, or includes, a first rigid, semi-rigid, or flexible tube and the second tube-like member is, or includes, a second rigid, semi-rigid, or flexible tube (i.e. positioned within the first tube). Each pair of possibilities correspond to a separate embodiment. According to some embodiments, the first tube-like member is, or includes, a first stent and the second tube-like member is, or includes, a second stent (i.e. positioned within the first stent).

According to some embodiments, the first tube-like member is, or includes, a first inflatable balloon, and the second tube-like member is, or includes, a second inflatable balloon (i.e. positioned within the first inflatable balloon). For example, the deployable element may be, or include, an inflatable double-lumen annular balloon.

As used herein, according to some embodiments, the term "active agent" may refer to a molecule, compound, composition, or substance configured to exert an effect at the aneurysm. According to some embodiments, the active agent may be configured to exert an effect on the content of the aneurysm or may be used to accumulate in the aneurysm.

According to some embodiments, wherein the target site includes the aneurysm cavity, the active agent may include one or more of a thrombotic agent, glue agent, gelling agent, crosslinker, plasticizer, binder, and/or any combination thereof. According to some such embodiments, the active agent may further include proteins such as fibrous proteins (e.g. collagen, elastin) and/or adhesion proteins (e.g. actin, fibrin, fibrinogen, fibronectin, vitronectin, laminin, cadherins, selectins, intracellular adhesion molecules, integrins, and/or any combination thereof).

According to some embodiments, the method further includes: (i) prior to the delivering of the water-immiscible fluid, inserting into the blood vessel a deployable element (e.g. deployable members 570 and 670), and (ii) shifting (moving) the deployable element along the blood vessel to a position wherein the deployable element is adjacent to the target site. The deployable element includes a hollow body configured to allow flow of blood therethrough. The hollow body is shaped such that, when the deployable element is properly installed within the blood vessel, a surface of the hollow body and a wall(s) of the blood vessel define a pocket (space) configured to allow trapping of water-immiscible fluid therein. In the step of delivering the water-immiscible fluid, the water-immiscible fluid may be delivered into the pocket between the surface of the hollow body and the wall of the blood vessel.

According to some embodiments, the hollow body extends from a round, or substantially round, first edge to a round, or substantially round, second edge. Each of the first edge and second edge has a diameter substantially equal to a diameter of the blood vessel. An intermediate section of the hollow body has a diameter smaller than both the diameter of the first edge and the diameter of the second edge.

According to some embodiments, the hollow body is hourglass-shaped, or substantially hourglass-shaped.

According to some embodiments, the deployable element further includes a catheter tube. An end portion of the catheter tube is attached to one of the edges of the hollow body, such as to allow delivering water-immiscible fluid into the pocket formed between the surface of the hollow body and the wall of the blood vessel when the deployable element is properly installed within the blood vessel.

According to some embodiments, the catheter tube is further configured for delivering therethrough the active agent.

According to some embodiments, the catheter tube includes a first catheter lumen and a second catheter lumen. The first catheter lumen is configured for delivering therethrough the water-immiscible fluid and the second catheter lumen is configured for delivering therethrough the active agent.

According to some embodiments, the pocket between the surface of the hollow body and the wall of the blood vessel may be filled with the water-immiscible fluid prior to the shifting of the deployable element along the blood vessel.

According to some embodiments, the water-immiscible fluid is delivered into the pocket after the shifting of the deployable element along the blood vessel to the target site.

According to some embodiments, the surface of the hollow body of the deployable element (e.g. deployable member 670) includes a catheter insertion port dimensioned such as to prevent escape therethrough of the water-immiscible fluid when the deployable element is properly installed within the blood vessel and the pocket between the surface of the hollow body and the wall of the blood vessel is filled with water-immiscible fluid. In the step of administering the active agent, the active agent is administered using a catheter inserted via the catheter insertion port into the pocket between the surface of the hollow body and the wall of the blood vessel.

According to some embodiments, the deployable element is configured for use in treating an aneurysm. In particular, a distance between the first edge and the second edge of the hollow body may be greater than a typical dimension (e.g. diameter) of an aneurysm neck of the aneurysm, such as to allow for the formation of a meniscus at the aneurysm neck when water-immiscible fluid is injected into the pocket defined by the hollow body and the wall(s) of the blood vessel.

According to some embodiments, the water-immiscible fluid includes a marker. According to some such embodiments, the marker is selected from the group consisting of iodine, barium, metrizamide, gadolinium, gold, air, carbon dioxide, and/or any derivative/combination thereof.

According to some embodiments, the deployable element may include, or be coated with, a drug.

According to some embodiments, the water-immiscible fluid may be introduced into the deployable element (e.g. deployable elements 570, 670, 770, and 970) prior to the moving of the deployable element to the vicinity of the target site. In such embodiments, the step of delivering the water-immiscible fluid to the vicinity of the target site involves using the deployable element to transport the water-immiscible fluid to the vicinity of the target site.

According to an aspect of some embodiments, there is provided a deployable element (e.g. deployable members 570 and 670) for localized treatment at a target site in a blood vessel of a subject. The deployable element includes a hollow body configured to allow flow of blood therethrough. The hollow body is shaped such that, when the deployable element is properly installed within a blood vessel, a surface of the hollow body and a wall of the blood vessel define a pocket (space, volume) configured to allow trapping of a water-immiscible fluid therein.

According to some embodiments of the deployable element, the hollow body extends from a round, or substantially round, first edge to a round, or substantially round, second edge. Each of the first edge and second edge has a diameter substantially equal to a diameter of the blood vessel. An intermediate section of the hollow body has a diameter smaller than the diameter of the first edge and the diameter of the second edge.

According to some embodiments, the hollow body is hourglass-shaped, or substantially hourglass-shaped.

According to some embodiments of the deployable element, the deployable element further includes a catheter tube configured to allow delivering therethrough the water-immiscible fluid into the pocket (formed between the surface of the hollow body and the wall of the blood vessel when the deployable element is properly installed within the blood vessel). The catheter tube is optionally further configured for withdrawing therethrough the water-immiscible fluid from the pocket.

According to some embodiments of the deployable element, the catheter tube is further configured for delivering therethrough the active agent.

According to some embodiments of the deployable element, the catheter tube includes a first catheter lumen and a second catheter lumen. The first catheter lumen may be configured for delivering therethrough the water-immiscible fluid and the second catheter lumen may be configured for delivering therethrough the active agent.

According to some embodiments of the deployable element, an end portion of the catheter tube is attached to one of the edges of the hollow body.

According to some embodiments of the deployable element, the surface of the hollow body includes a catheter insertion port dimensioned such as to prevent escape therethrough of the water-immiscible fluid.

According to some embodiments of the deployable element, the deployable element is configured for treating an aneurysm.

According to an aspect of some embodiments, there is provided a kit for treating an aneurysm in a blood vessel. The kit includes:
A deployable element (e.g. deployable elements 570, 670, 770 and 970), as described above.

A water-immiscible fluid configured to be administered into the blood vessel and to isolate the aneurysm from the blood flow in the blood vessel.

An active agent for treating the aneurysm by exertion of an effect on the content of the aneurysm or by accumulation in the aneurysm.

According to some embodiments of the kit, wherein the catheter does not form part of the deployable element, a catheter may be additionally provided as part of the kit.

According to some embodiments of the kit, the kit is configured for treating wide-neck and fusiform aneurysms. The deployable element includes a hole on a surface thereof. The hole has a smaller diameter than a diameter of a neck of a wide-neck or fusiform aneurysm to be treated.

As used herein, according to some embodiments, the terms "block", "restrict", "occlude", and any derivatives thereof, may be interchangeable, and may refer to fully/partially blocking blood flow, and/or altering a direction/pressure/rate of the blood flow. According to some embodiments, "blood flow blockage" may refer to the rate of the blood flow being reduced by up to 90%, 85%, 75%, or even 50% as compared to the rate of flow when the blockage is absent. Each possibility is a separate embodiment. According to some embodiments, "blood flow blockage" may refer to full blockage of the blood flow.

According to some embodiments, the water-immiscible fluid forms a substantially stable and continuous phase/medium in the blood vessel which does not break up due to the blood pulsation. In particular, according to some embodiments, the water-immiscible fluid allows the formation of a barrier (e.g. a meniscus) in the neck of the aneurysm which withstands changes in pressure due to the blood pulsation.

According to some embodiments, the water-immiscible fluid (in particular, the surface tension thereof) may be selected based on the diameter of the neck of the targeted aneurysm (for example, if the neck has a relatively small diameter, a water-immiscible fluid with a lower surface tension may be used as compared to when treating a wide-neck aneurysm). Thus, according to some embodiments, the disclosed methods may further include an initial step of imaging the aneurysm and obtaining the dimensions of the neck thereof. According to some embodiments, the water-immiscible fluid is configured to allow the formation of a barrier (e.g. a meniscus) at the neck of the aneurysm, where through a catheter can be inserted without breaking up the barrier.

As used herein, according to some embodiments, the terms "vascular disease" and "vascular malformation" may be used interchangeably and may refer to any congenital and/or non-congenital blood vessel abnormality, such as, but not limited to, aneurysms, fistulas, tumors, and arteriovenous malformations. It will be understood that the methods and devices disclosed herein may be applicable to vascular malformations other than aneurysms, as listed above and throughout the application.

As used herein, according to some embodiments, the terms "subject" and "patient" are used interchangeably and may refer to a human or to a non-human mammal.

As used herein, according to some embodiments, the terms "water-immiscible material" and "water-immiscible fluid" are used interchangeably.

It is appreciated that certain features of the disclosure, which are, for clarity, described in the context of separate embodiments, may also be provided in combination in a single embodiment. Conversely, various features of the disclosure, which are, for brevity, described in the context of a single embodiment, may also be provided separately or in any suitable sub-combination or as suitable in any other described embodiment of the disclosure. No feature described in the context of an embodiment is to be considered an essential feature of that embodiment, unless explicitly specified as such.

Although steps of methods according to some embodiments may be described in a specific sequence, methods of the disclosure may include some or all of the described steps carried out in a different order. A method of the disclosure may include a few of the steps described or all of the steps described. No particular step in a disclosed method is to be considered an essential step of that method, unless explicitly specified as such.

Although the disclosure is described in conjunction with specific embodiments thereof, it is evident that numerous alternatives, modifications and variations that are apparent to those skilled in the art may exist. Accordingly, the disclosure embraces all such alternatives, modifications and variations that fall within the scope of the appended claims. It is to be understood that the disclosure is not necessarily limited in its application to the details of construction and the arrangement of the components and/or methods set forth herein. Other embodiments may be practiced, and an embodiment may be carried out in various ways.

The phraseology and terminology employed herein are for descriptive purpose and should not be regarded as limiting. Citation or identification of any reference in this application shall not be construed as an admission that such reference is available as prior art to the disclosure. Section headings are used herein to ease understanding of the specification and should not be construed as necessarily limiting.

What is claimed is:

1. A method for providing a localized treatment at an aneurysm in a blood vessel of a subject, the aneurysm comprising an aneurysm cavity and an aneurysm neck positioned between a main lumen of the blood vessel and the aneurysm cavity, the method comprising:

delivering a water-immiscible fluid to the aneurysm neck so as to temporarily fluidly-isolate the aneurysm neck from a blood circulation, and so as to form a barrier to a blood flow at the aneurysm neck, thereby fluidly-isolating the aneurysm cavity from the main lumen of the blood vessel, wherein the water-immiscible fluid is prevented from penetrating into the aneurysm cavity; and administering an active agent to the aneurysm cavity, wherein the water-immiscible fluid and the active agent are substantially mutually immiscible, so that the active agent is trapped by the water-immiscible fluid, wherein at least a portion of the active agent is delivered into the aneurysm, the active agent being configured to form or to induce a formation of a blood clot in the aneurysm cavity.

2. The method of claim 1, wherein the method further comprises, prior to the delivering of the water-immiscible fluid, blocking a blood flow to the blood vessel; and/or wherein the method further comprises, prior to the delivering of the water-immiscible fluid, diluting blood in the aneurysm neck by a saline infusion and/or a viscoelastic fluid, which is further configured to locally increase a viscosity of the blood and dampen blood vortices.

3. The method of claim 1, wherein the active agent comprises nucleic acids, the method being thereby configured for providing gene therapy at the aneurysm cavity; and/or wherein the active agent comprises an anticancer drug targeting a cancerous cell growth at the aneurysm cavity, the method being thereby configured to treat the cancerous cell growth; and/or wherein the active agent comprises one or more substances configured to dissolve a deposit or a lesion at the aneurysm cavity, the method being thereby configured for treating a blockage in the blood vessel.

4. The method of claim 1, wherein the water-immiscible fluid and the active agent are delivered in a three-layered injection, wherein a first layer, injected first, comprises a first portion of the water-immiscible fluid, a second layer, injected second, comprises the active agent, and a third layer, injected third, comprises a second portion of the water-immiscible fluid, the three-layered injection being injected continuously one after the other such that the second layer, which is positioned between the first layer and the third layer, is maneuvered, at least in part, to the aneurysm cavity.

5. The method of claim 1, wherein the aneurysm cavity comprises a deposit or a lesion, which forms a full blockage of the blood vessel, wherein the active agent comprises one or more substances configured to dissolve the deposit or the lesion, and wherein the water-immiscible fluid and the active agent are delivered in a two-layered injection, wherein a first layer, injected first, comprises the water-immiscible fluid, and a second layer, injected second, comprises the active agent, and wherein the two-layered injection is injected continuously, one after the other, so as to fluidly-isolate the second layer between the full blockage and the first layer.

6. The method of claim 1, wherein the active agent is directly administered into the aneurysm cavity using a catheter, which extends into the aneurysm cavity through the barrier formed by the water-immiscible fluid.

7. The method of claim 1, wherein a surface tension of the water-immiscible fluid is such that the water-immiscible fluid is prevented from penetrating into the aneurysm cavity through the aneurysm neck; and wherein the water-immiscible fluid is configured to form a meniscus at the aneurysm neck, wherein the meniscus constitutes the barrier.

8. The method of claim 1, further comprising, simultaneously, or substantially simultaneously, to the administering of the active agent, withdrawing blood from the aneurysm, so as to maintain an integrity or positioning of the barrier.

9. The method of claim 1, further comprising:

inserting into the blood vessel a tube-like deployable element, which is hollow and has a hole on a circumferential surface thereof, wherein the hole has a smaller diameter than a diameter of the aneurysm neck, wherein the tube-like deployable element is configured to receive thereinto the water-immiscible fluid; and mounting the tube-like deployable element in the blood vessel such that a part of the circumferential surface of the tube-like deployable element is adjacent to the aneurysm neck and the hole is aligned with the aneurysm neck, thereby facilitating the formation by the water-immiscible fluid of the barrier at the hole when the water-immiscible fluid is delivered thereto.

10. The method of claim 9, wherein the tube-like deployable element comprises an outer tube-like member and an inner tube-like member extending inside and along the outer tube-like member, wherein the hole is located on a shell of the outer tube-like member, said shell defining the circumferential surface, wherein the inner tube-like member and the outer tube-like member are configured to receive into a gap therebetween the water-immiscible fluid, and wherein the inner tube-like member is configured to facilitate a blood flow therethrough.

11. The method of claim 1, further comprising:

prior to the delivering of the water-immiscible fluid, inserting into the blood vessel a deployable element comprising a hollow body configured to allow a blood flow therethrough, the hollow body being shaped such that, when the deployable element is properly installed within the blood vessel, a surface of the hollow body and a wall of the blood vessel define a pocket configured to allow trapping the water-immiscible fluid therein;

shifting the deployable element along the blood vessel to a position wherein the deployable element is adjacent to the aneurysm cavity; and wherein the water-immiscible fluid is delivered into the pocket between the surface of the hollow body and the wall of the blood vessel.

12. The method of claim 11, wherein the deployable element further comprises a catheter tube, and wherein an end portion of the catheter tube is attached to the hollow body, so as to allow the delivering the water-immiscible fluid into the pocket formed between the surface of the hollow body and the wall of the blood vessel when the deployable element is properly installed within the blood vessel;

wherein the surface of the hollow body comprises a catheter insertion port dimensioned so as to prevent escape therethrough of the water-immiscible fluid when the deployable element is properly installed within the blood vessel and the pocket between the surface of the hollow body and the wall of the blood vessel is filled with water-immiscible fluid; and wherein the active agent is administered using a catheter inserted via the catheter insertion port into the pocket between the surface of the hollow body and the wall of the blood vessel.

13. The method of claim 1, wherein a surface tension of the water-immiscible fluid compared to water is in the range of from about 40 mN/m to about 70 mN/m at a temperature of 20° C.; and/or wherein the water-immiscible fluid is hydrophobic; and/or wherein the water-immiscible fluid is a gas.

* * * * *